United States Patent
Hoshino et al.

(10) Patent No.: US 11,900,440 B2
(45) Date of Patent: Feb. 13, 2024

(54) COMMODITY TRANSPORTING APPARATUS, COMMODITY TRANSPORTING APPARATUS METHOD, AND COMMODITY TRANSPORTING SYSTEM

(71) Applicant: Toshiba Tec Kabushiki Kaisha, Tokyo (JP)

(72) Inventors: Naoki Hoshino, Hasuda Saitama (JP); Mayuko Tsunoda, Yokohama Kanagawa (JP); Shota Konishi, Kawasaki Kanagawa (JP); Yumiko Okuma, Koganei Tokyo (JP); Kanya Hiroi, Yokohama Kanagawa (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 18/179,161

(22) Filed: Mar. 6, 2023

(65) Prior Publication Data
US 2023/0214907 A1     Jul. 6, 2023

Related U.S. Application Data

(63) Continuation of application No. 17/407,112, filed on Aug. 19, 2021, now abandoned.

(30) Foreign Application Priority Data

Dec. 1, 2020   (JP) ................................. 2020-199260

(51) Int. Cl.
*G06Q 30/00*   (2023.01)
*G06Q 30/0601*   (2023.01)

(52) U.S. Cl.
CPC .............................. *G06Q 30/0635* (2013.01)

(58) Field of Classification Search
CPC ................................................. G06Q 30/0635
(Continued)

(56) References Cited

U.S. PATENT DOCUMENTS 10,266,196 B1 *  4/2019  Sinha .................... B62B 3/008
10,592,962 B1    3/2020  Lauka et al.
(Continued)

FOREIGN PATENT DOCUMENTS

JP         2020-152534 A       9/2020

OTHER PUBLICATIONS

'Smart carts' help do the grocery shopping: [final edition]. (May 31, 2005). Sault Star Retrieved from https://www.proquest.com/newspapers/smart-carts-help-do-grocery-shopping/docview/348645471/se-2 (Year: 2005).*

(Continued)

*Primary Examiner* — Arielle E Weiner
(74) *Attorney, Agent, or Firm* — Kim & Stewart LLP

(57) ABSTRACT

According to an embodiment, the controller of a commodity pickup apparatus obtains information related to a commodity to be picked up and the number of pieces thereof. Further, the controller detects a fact that a commodity picked up is put in the accommodation portion and commodity information of the commodity put in the accommodation portion, on the basis of an image obtained by imaging the accommodation portion. The display device of the commodity pickup apparatus identifies the commodity to be picked up as a commodity picked up, a commodity to be picked up next, or a commodity not yet picked up and displays the commodity.

10 Claims, 16 Drawing Sheets

(58) Field of Classification Search
USPC .................................................. 705/26.81
See application file for complete search history.

(56) References Cited

U.S. PATENT DOCUMENTS

| | | |
|---|---|---|
| 2015/0379601 A1 | 12/2015 | Ouimet |
| 2016/0148300 A1 | 5/2016 | Carr et al. |
| 2019/0325377 A1 | 10/2019 | Rajkhowa et al. |
| 2020/0065748 A1* | 2/2020 | Durkee .............. G06Q 30/0641 |
| 2020/0275059 A1 | 8/2020 | De Bonet et al. |
| 2020/0372440 A1* | 11/2020 | Holmes ................ G06F 16/904 |
| 2021/0177163 A1* | 6/2021 | Cohn ................... G07G 1/0072 |
| 2021/0383458 A1* | 12/2021 | Crawford ............. G06Q 10/087 |

OTHER PUBLICATIONS

Yanai, "The Current State and Future Directions on Generic Object Recognition" Journal of Information Processing Society of Japan, vol. 48, No. SIG16, Nov. 2007, pp. 1-24 (with English abstract).
Shotton et al. "Semantic texton forests for image categorization and segmentation" 2008 IEEE Conference on Computer Vision and Pattern Recognition, 2008, pp. 1-8.

* cited by examiner

I(t)

I(t+Δt)

J(t+Δt)
=I(t+Δt)−I(t)

COMMODITY TRANSPORTING APPARATUS, COMMODITY TRANSPORTING APPARATUS METHOD, AND COMMODITY TRANSPORTING SYSTEM

CROSS-REFERENCE TO RELATED APPLICATIONS

This application is a continuation of U.S. patent application Ser. No. 17/407,112, filed Aug. 19, 2021, which is based upon and claims the benefit of priority from the prior Japanese Patent Application No. 2020-199260, filed on Dec. 1, 2020, the entire contents of which are incorporated herein by reference.

FIELD

Embodiments described herein generally relate to a commodity pickup apparatus and a commodity pickup system.

BACKGROUND

In stores such as supermarkets and convenience stores, customers order commodities to be purchased when doing shopping. Persons in charge of the stores collect the ordered commodities. In other words, the following purchasing form is proposed, in which customers pick up commodities, and persons in charge of stores send the commodities picked up to the customers.

For example, in the stores described above, a sorting apparatus that determines whether an object is put (sorted) at a correct position has been proposed.

However, the sorting apparatus described above determines whether the object is put at a predetermined sorting position on the basis of the weight of the put object. So, when heavy objects and lightweight objects such as commodities handled in the store are mixed, it has been difficult to certainly identify all of those objects accommodated in an accommodation portion such as a basket. More specifically, it has been difficult to identify a rice bag of 10 kg put in a basket and sweet stuff of several tens of grams put in the basket by using the same weight sensor.

DETAILED DESCRIPTION

Figure 1:
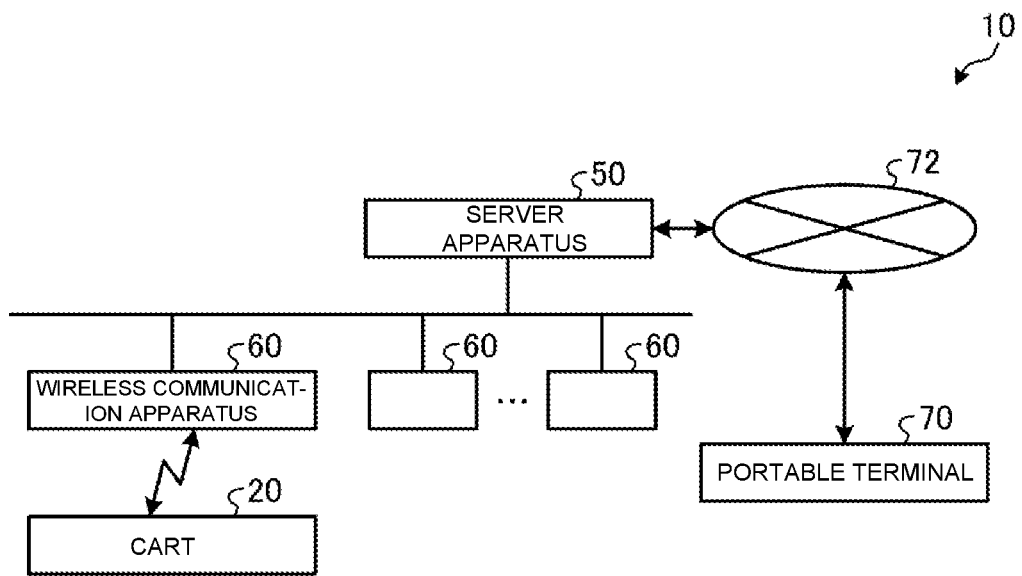
FIG. 1 is a system block diagram showing an example of a system configuration of a commodity pickup system according to an embodiment.

According to one embodiment, a commodity pickup apparatus accommodates a commodity picked up in an accommodation portion. The commodity pickup apparatus includes a communication interface, an imaging device, a display device, and a controller. The communication interface communicates with outside. The imaging device images the accommodation portion. The display device displays information regarding pickup of a commodity. The controller obtains order information from outside via the communication interface, the order information being related to a commodity to be picked up and the number of pieces thereof. The controller detects a fact that the commodity picked up is put in the accommodation portion and commodity information of the commodity put in the accommodation portion, on the basis of an image obtained by imaging the accommodation portion by the imaging device. The controller identifies the commodity to be picked up as a commodity picked up, a commodity to be picked up next, or a commodity not yet picked up on the basis of the obtained order information and the detected information, and causes the display device to display the commodity.

Hereinafter, a commodity pickup apparatus and a commodity pickup system according to an embodiment will be described with reference to the drawings. The same reference symbols in the drawings will denote the same or similar portions.

First Embodiment

A commodity pickup system 10 as a first embodiment will now be described.

(Overall Configuration of Commodity Pickup System)

First, an overall configuration of the commodity pickup system 10 will be described with reference to FIG. 1. FIG.

1 is a system block diagram showing an exemplary system configuration of the commodity pickup system of the first embodiment.

The commodity pickup system 10 includes a cart 20, a server apparatus 50, and a portable terminal 70. The cart 20 is pushed by a store clerk to be moved in a store or in the backyard. The cart 20 includes a basket for accommodating commodities. The store clerk picks up the commodities ordered by a customer and accommodates the commodities in the basket of the cart 20. Although a single cart 20 is shown in FIG. 1, a plurality carts 20 may be present. Each cart 20 is given a unique identification number for identifying an individual cart. Note that the cart 20 is an example of the commodity pickup apparatus in this embodiment.

The server apparatus 50 receives the orders of commodities from the portable terminal 70 of a customer, such as a smartphone, a tablet terminal, or a personal computer, via the Internet 72. Further, the server apparatus 50 generates commodity pickup information including commodities to be picked up and the number of pieces thereof on the basis of the order received from the customer. Furthermore, the server apparatus 50 transmits the generated commodity pickup information to the cart 20. Note that the commodity pickup information may include path information (pickup path information) indicating a movement path for efficiently picking up all of the ordered commodities.

In the store, a plurality of wireless communication apparatus 60 connected to the server apparatus 50 are installed. The server apparatus 50 transmits the commodity pickup information and the pickup path information to the cart 20 via the wireless communication apparatus 60 having the best communication state.

A store clerk (picker) who moves the cart 20 takes out commodities to be picked up from the display shelf for commodities and accommodates the commodities in the cart 20. The cart 20 then detects the accommodated commodities and determines whether or not the correct commodities have been accommodated. Note that a configuration of the cart 20 will be described in detail later (see FIG. 2).

(Overall Configuration of Cart)

Figure 2:
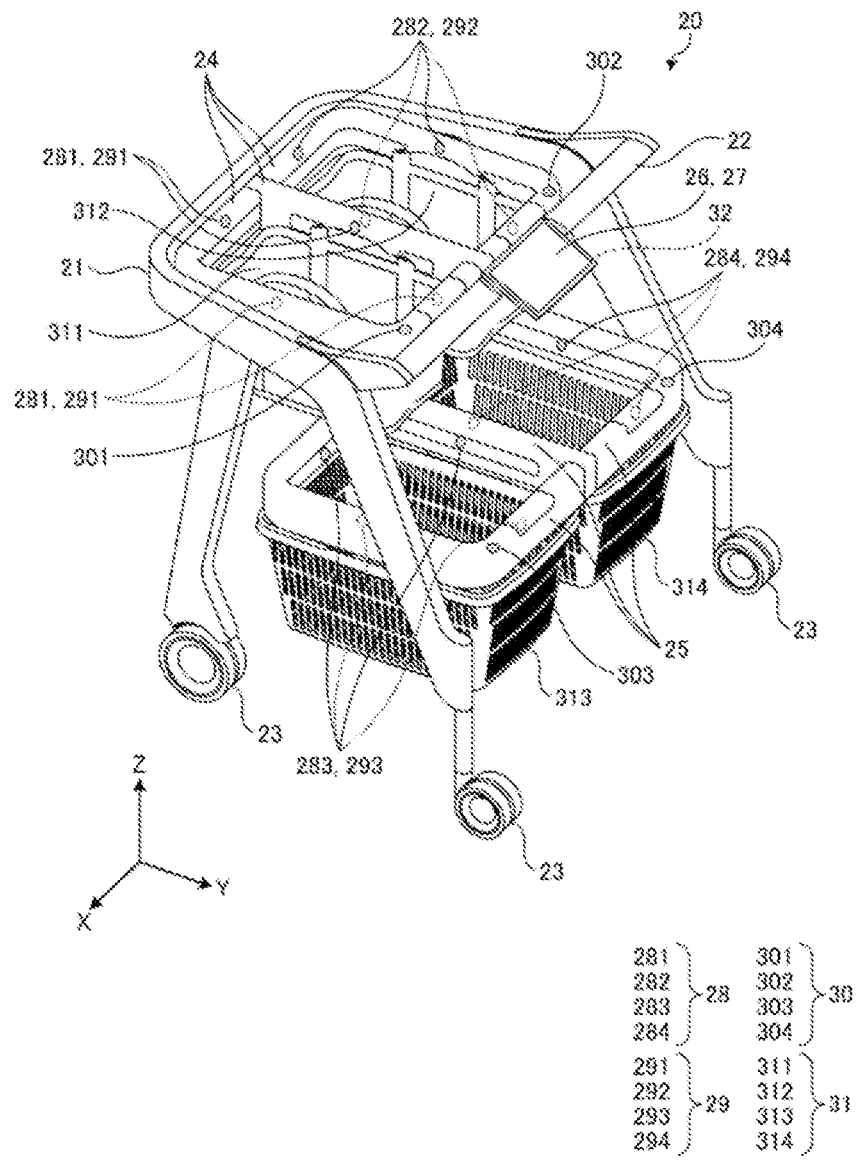
FIG. 2 is an overall perspective view showing a cart as an example of the commodity pickup apparatus according to the embodiment.

Next, an overall configuration of the cart 20 will be described with reference to FIG. 2. FIG. 2 is an overall perspective view of the cart, which is an example of the commodity pickup apparatus.

The main constituent member of the cart 20 is a frame 21. A handle 22 and casters 23 are attached to the frame 21. The casters 23 are small wheels and are free to turn the direction, i.e., change the traveling direction of the cart 20 depending on the direction of the force applied to the handle 22. The picker grasps the handle 22 and moves the cart 20 in the store while changing the traveling direction by the casters 23.

A container installation frame 24 is provided at the upper portion of the frame 21. A container installation frame 25 is provided at the lower portion of the frame 21. The container installation frame 24 is a frame member in which two different bags 311 and 312 can be removably installed. The container installation frame 25 is a frame member in which two different baskets 313 and 314 can be removably installed. The picker distinguishes and accommodates commodities corresponding to different orders in the bags 311 and 312 and the baskets 313 and 314. Note that, in the example shown in FIG. 2, the bags 311 and 312 are installed in the container installation frame 24, and the baskets 313 and 314 are installed in the container installation frame 25, but the embodiment is not limited to this example. In other words, the bags may be installed in both of the container installation frames 24 and 25, or the baskets may be installed both of the container installation frames 24 and 25. The bags 311 and 312 and the baskets 313 and 314 are examples of the container and the accommodation portion 31 of this embodiment.

A display device 26 is installed on the handle 22. The display device 26 includes, for example, a liquid crystal panel or an organic EL panel, and displays image information thereon. The display device 26 displays a list of commodities to be picked up. In addition, the display device 26 displays a movement path or the like for efficiently picking up commodities (for details, see FIG. 5). Further, a touch panel 27 is installed on the display surface of the display device 26 while being laminated on the display surface. The display device 26 receives an operation input of the picker. The display device 26 may be, for example, a portable terminal such as a tablet terminal or a smartphone.

A global positioning system (GPS) receiver 32 is installed inside the casing of the display device 26. The GPS receiver 32 receives GPS signals output from a GPS satellite, performs positioning to specify its own position, and thus specifies the current position and the traveling direction of the cart 20 in the store. Note that the method of specifying the current position of the cart 20 is not limited to the GPS positioning. For example, communication may be performed with the plurality of wireless communication apparatus 60, and the self-position of the cart 20 may be specified on the basis of the intensity of the signals received from the respective wireless communication apparatus 60. Alternatively, the self-position of the cart 20 may be specified by receiving reference signals output from a plurality of beacon posts installed in the store.

The container installation frame 24 and the container installation frame 25 include a plurality of cameras 28 (281, 282, 283, and 284) and a plurality of illumination light emitting diodes (LEDs) 29 (291, 292, 293, and 294) toward the inside of the bags 311 and 312 and the baskets 313 and 314. More specifically, four cameras 281 and four illumination LEDs 291 are installed in the position where the bag 311 is installed. The four cameras 281 are installed at respective positions with the equal height in the Z-axis direction and substantially horizontally installed along the X-axis and the Y-axis. Note that the installation positions of the cameras 281 will be described in detail later (see FIG. 3). The four cameras 281 capture images of a region, through which a commodity is expected to pass, from four different directions when the commodity is put into the bag 311. Note that FIG. 2 does not show the specific installation positions of the illumination LEDs 291 clearly, but the illumination LEDs 291 are installed in the vicinity of the respective cameras 281 to illuminate at least the imaging ranges of the respective cameras 281. Note that the camera 28 is an example of an imaging device in this embodiment.

Similarly, four cameras 282 and four illumination LEDs 292 are installed in the position where the bag 312 is installed. Further, four cameras 283 and four illumination LEDs 293 are installed in the position where the basket 313 is installed. In addition, four cameras 284 and four illumination LEDs 294 are installed in the position where the basket 314 is installed.

Further, guide lights 30 (301, 302, 303, and 304) are installed in the container installation frame 24 and the container installation frame 25 at positions visible from the picker who moves the cart 20. The guide light 301 is an indicator to indicate that a commodity to be picked up next is to be put in the bag 311. The guide light 302 is an indicator to indicate that a commodity to be picked up next is to be put in the bag 312. The guide light 303 is an indicator to indicate that a commodity to be picked up next is to be put in the basket 313. The guide light 304 is an indicator to indicate that a commodity to be picked up next is to be put in the basket 314.

Note that, when the cart 20 is moved along the pickup path information, a commodity at the nearest position is selected as the commodity to be picked up next. The cart 20 turns on the guide light 30 corresponding to the accommodation position of the commodity. Note that the lighted guide light 30 is turned off when it is detected that the correct commodity is put at a predetermined position. The cart 20 then turns on the guide light 30 corresponding to the accommodation position of a commodity to be picked up next.

(Commodity Input Detection Method and Input Commodity Recognition Method)

Figure 3:
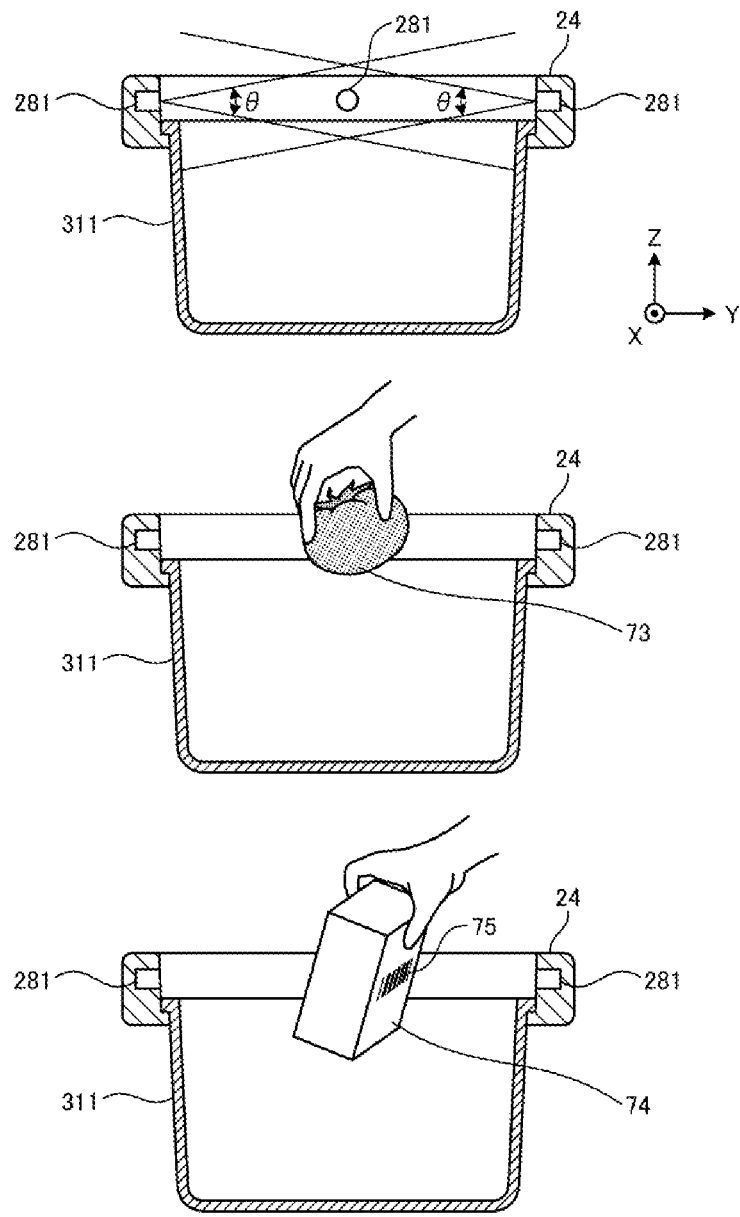
FIG. 3 is a view for describing the function of cameras installed in the cart according to the embodiment.
Figure 4:
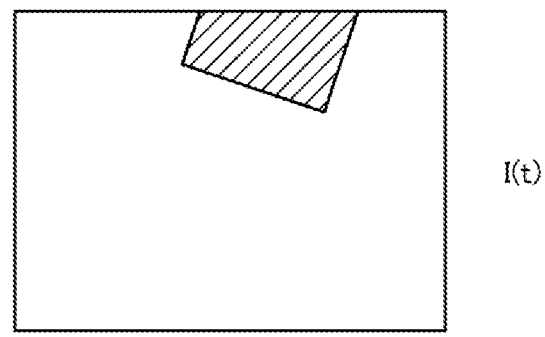
FIG. 4 is a view for describing a method of detecting that a commodity is put from images captured by the cameras installed in the cart according to the embodiment.
Figure 4:
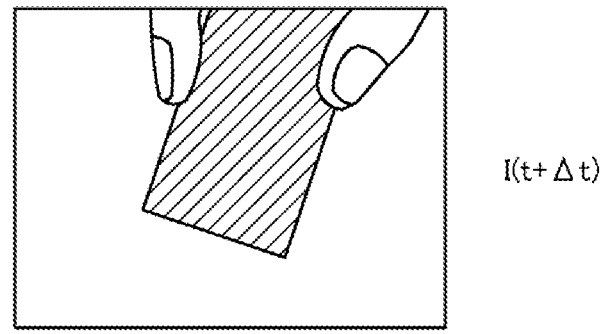
Figure 4:
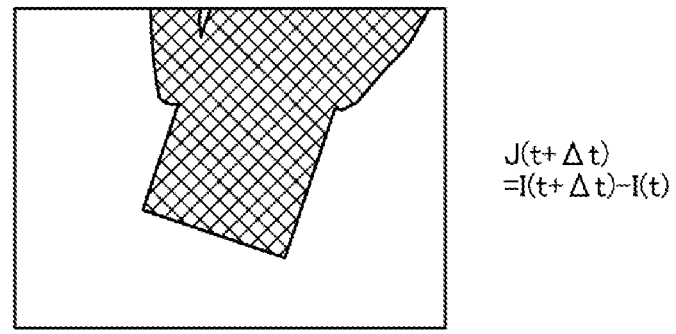

Next, a method in which the cart 20 detects the input of a commodity and recognizes the input commodity will be described with reference to FIGS. 3 and 4. FIG. 3 is a diagram for describing the function of the cameras installed in the cart. FIG. 4 is a diagram for describing a method of detecting the input of a commodity from images captured by the cameras installed in the cart.

The upper part of FIG. 3 is a YZ cross-sectional view showing a state where the bag 311 is attached to the container installation frame 24 of the cart 20. The cameras 281 are respectively installed in the four inner surfaces of the container installation frame 24. FIG. 3 shows only three of the four cameras 281. The cameras 281 at the opposing positions are installed at the same height positions with the observation ranges thereof facing each other. Further, each camera 281 has the same viewing angle θ. Note that the illumination LEDs 291 for illuminating at least the range of the viewing angle θ are installed in the vicinity of the cameras 281, though not shown in the figure.

The middle part of FIG. 3 is a diagram showing an exemplary state where a perishable food 73 is being put in the bag 311. Each camera 281 captures an image at the same time on the basis of an external synchronization signal output from the cart 20. Such an imaging operation is continuously executed regardless of whether or not a commodity is put in. As a result, four images are captured at the same time. The cart 20 determines whether there is a possibility that a commodity has been put in the cart 20 for each of the captured four images. The cart 20 then performs commodity input determination processing for identifying the input commodity. The commodity input determination processing will be described in detail later (see FIG. 4). Note that the speed of a commodity when the commodity is put in the cart 20 is not constant. Therefore, in order to suppress blurring of the images to be captured, it is desirable to perform imaging at a shutter speed as high as possible. Since the images become dark when imaging is performed at a high shutter speed, the illumination LEDs 291 are turned on to ensure image brightness. Note that the illumination LEDs 291 only need to be turned on at only at least the moment of imaging.

If it is determined by the commodity input determination processing that there is a possibility that a commodity has been put in the cart 20, the cart 20 subsequently performs object recognition. The object recognition in which the commodities appearing the images are recognized is also called generic object recognition. Various recognition technologies used in the generic object recognition are described in detail in the following literatures, and thus descriptions thereof will be omitted.

Keiji Yanai, "The Current State and Future Directions on Generic Object Recognition", Journal of Information Processing Society of Japan, Vol. 48, No. SIG16 [Search on Nov. 18, 2020], the Internet <URL: https://mm.cs.uec.ac.jp/IPSJ-TCVIM-Yanai.pdf>

Jamie Shotton, et al., "Semantic Texton Forests for Image Categorization and Segmentation", [Search on Nov. 18, 2020], the Internet <URL: http://mi.eng.cam.ac.uk/~cipolla/publications/inproceedings/2008-CVPR-semantic-texton-forests.pdf>

Further, in the object recognition, whether or not a code symbol such as a bar code or a two-dimensional code appears in the captured image is recognized. In the object recognition, if the code symbol appears in the captured image, the code symbol is read.

In the example of the middle part of FIG. 3, the cart 20 detects the input of a commodity and subsequently recognizes that the input commodity is a perishable food 73.

The lower part of FIG. 3 is a diagram showing an exemplary state where a store clerk puts a commodity 74 with a bar code in the bag 311. In this case as well, the cart 20 performs the same processing as the processing described above. The cart 20 then detects the input of the commodity and subsequently reads a bar code 75 attached to the input commodity. The cart 20 collates the code information recorded in the read bar code 75 with a commodity master 52M (see FIG. 6), and thus recognizes that the input commodity is the commodity 74.

Next, referring to FIG. 4, the method of the commodity input determination processing will be described. The upper part of FIG. 4 shows an exemplary image I(t) captured by the camera 281 at time t. The middle part of FIG. 4 shows an exemplary image I(t+Δt) captured by the camera 281 at Δt seconds after, i.e., at time t+Δt.

The cart 20 performs a difference calculation to subtract the image I(t) from the image I(t+Δt). By the difference calculation, a difference image J(t+Δt) shown in the lower part of FIG. 4 is obtained.

When a commodity is put in the cart 20, the commodity passes through the observation range of the camera 281. So, in general, the region of the commodity appears in the difference image J(t+Δt). The difference image J(t+Δt) is a so-called gradation image in which the brightness is converted into a pixel value. The cart 20 binarizes the difference image J(t+Δt) with a predetermined threshold, to convert the difference image J(t+Δt) into a binary image. The cart 20 then determines, when the area of the region of the binary image exceeds a predetermined value, that there is a possibility that the brightness of the image has changed greatly during Δt seconds, that is, the commodity has been put in the cart 20.

If it is determined from the difference image J(t+Δt) that there is a possibility that the commodity has been put in the cart 20, it is considered that the commodity appears in the image I(t+Δt). So, the cart 20 performs the object recognition on the image I(t+Δt) to recognize the input commodity. Further, if a code symbol such as a bar code is attached to the commodity, the cart 20 reads the code information recorded in the code symbol.

Note that the above description is for describing the processing flow for the image captured by a single camera 281. Actually, the same processing is executed for the four sets of images captured by the four cameras 281. If it is determined, for only one set of images among the four sets of images captured by the four cameras 281, that there is a possibility that a commodity has been put in the cart 20, the cart 20 performs the object recognition on only the one set of images. On the other hand, if it is determined for a plurality of sets of images that there is a possibility that a commodity has been put in the cart 20, the cart 20 performs the object recognition on each of the plurality of sets of images. The commodity is recognized as the input commodity on the basis of, for example, a recognition result of the image from which a recognition result having the highest reliability is output.

(Information Displayed on Display Device of Cart)

Figure 5:
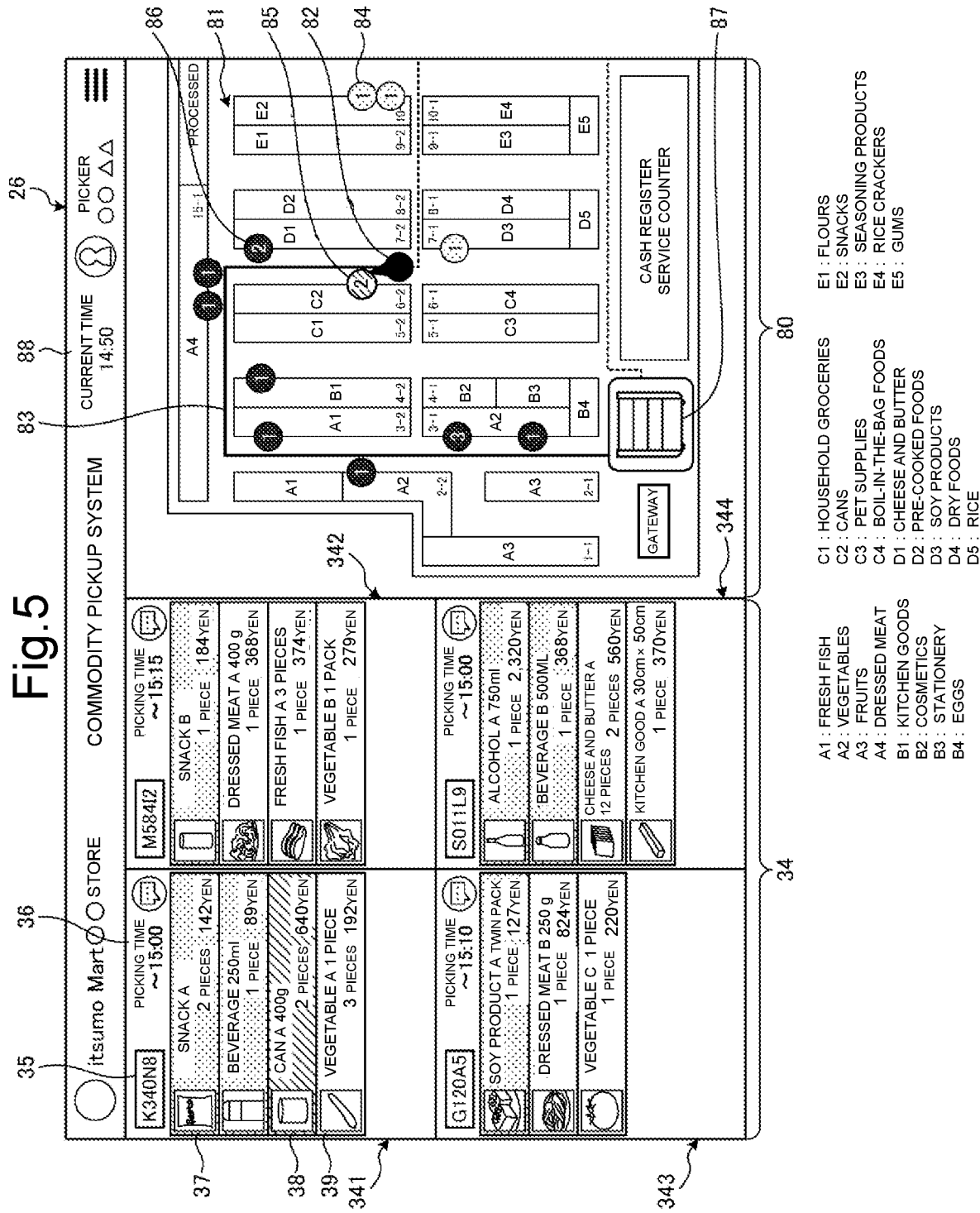
FIG. 5 is a view showing an example of information displayed on a display device of the cart according to the embodiment.

Next, the contents of information displayed on the display device 26 of the cart 20 will be described with reference to FIG. 5. FIG. 5 shows an example of information displayed on the display device 26 of the cart.

A commodity list 34 shown in FIG. 5 and an in-store map 80 are displayed on the display device 26 of the cart 20. The commodity list 34 is a list of commodities to be put in each of the plurality of accommodation portions 31, i.e., the bags 311 and 312 and the baskets 313 and 314. Note that the commodity list 34 corresponding to each accommodation portion 31 is displayed in a lined-up manner so as to coincide with the arrangement of the accommodation portion 31 when viewed from the store clerk (picker) holding the handle 22. More specifically, a commodity list 341 displayed on the upper left is a list of the commodities to be put in the bag 311 located on the upper left when viewed from the store clerk holding the handle 22. A commodity list 342 displayed on the upper right is a list of commodities to be put in the bag 312 located on the upper right when viewed from the store clerk holding the handle 22. A commodity list 343 displayed on the lower left is a list of commodities to be put in the basket 313 located on the lower left when viewed from the store clerk holding the handle 22. A commodity list 344 displayed on the lower right is a list of commodities to be put in the basket 314 located on the lower right when viewed from the store clerk holding the handle 22. In such a manner, the arrangement state of the bags and baskets 311 to 314 of the accommodation portion 31 is matched with the arrangement state of the commodity lists 341 to 344, and thus the store clerk can easily determine the positions (commodity input positions) of the bags and baskets 311 to 314 in which the picked-up commodities are to be put.

Further, the in-store map 80 shows a layout 81 of the aisles and shelves in the store.

An order number 35 and a pickup completion target time 36 are displayed in each of the commodity lists 34 (341, 342, 343, and 344). The order number 35 is an order number of commodities. Instead of the order number 35, information for uniquely identifying a customer may be displayed. The pickup completion target time 36 is the target time at which the pickup of the commodities is to be completed. Note that a current time 88 is displayed in the upper portion of the display device 26, and thus the store clerk picks up the commodities so as to be in the pickup completion target time 36 while referring to the pickup completion target time 36 and the current time 88.

Further, the commodities to be picked up are displayed in a lined-up state in the respective commodity lists 34 (341, 342, 343, and 344). The lined-up order is not limited, but in this embodiment, the commodities are lined up and displayed in the pickup order when the cart 20 is moved from the current position thereof along pickup path information 83, which will be described later.

The list indicating each commodity is displayed in a state where hatching corresponding to the progress state of pickup is added or in a state where coloring corresponding to the progress state of pickup is added. For example, in FIG. 5, the hatched commodity shown by a pickup state 37 indicates that it is the commodity already picked up. The hatched commodity shown by a pickup state 38 indicates that it is the commodity to be picked up next. Further, the hatched commodity shown by a pickup state 39 indicates that it is the commodity that has not yet been picked up.

The in-store map 80 further displays a current position 82, the pickup path information 83, and the numbers of commodities 84, 85, and 86.

The current position 82 is an icon indicating the current position and the traveling direction of the cart 20. Note that the current position and the traveling direction of the cart 20 are detected by the GPS receiver 32 provided in the cart 20 (see FIG. 7).

The pickup path information 83 is information indicating a movement path for efficiently picking up all the commodities ordered and transporting the picked-up commodities to a lash-up shelf 87. Note that, in the example shown in FIG. 5, the pickup path information 83 that has already been passed to reach the current position 82 is displayed in a display form changed to the dotted line so as to make the screen easy to see.

The numbers of commodities 84, 85, and 86 are icons each indicating the number of commodities to be picked up at that position. It is desirable that the numbers of commodities 84, 85, and 86 are displayed in accordance with the progress state of pickup. For example, the number of commodities 84 shown in FIG. 5 indicates the position and the number of commodities that have been picked up. The number of commodities 85 indicates the position and the number of commodities to be picked up next. Further, the number of commodities 86 indicates the position and the number of commodities that have not yet been picked up.

(Hardware Configuration of Server Apparatus)

Figure 6:
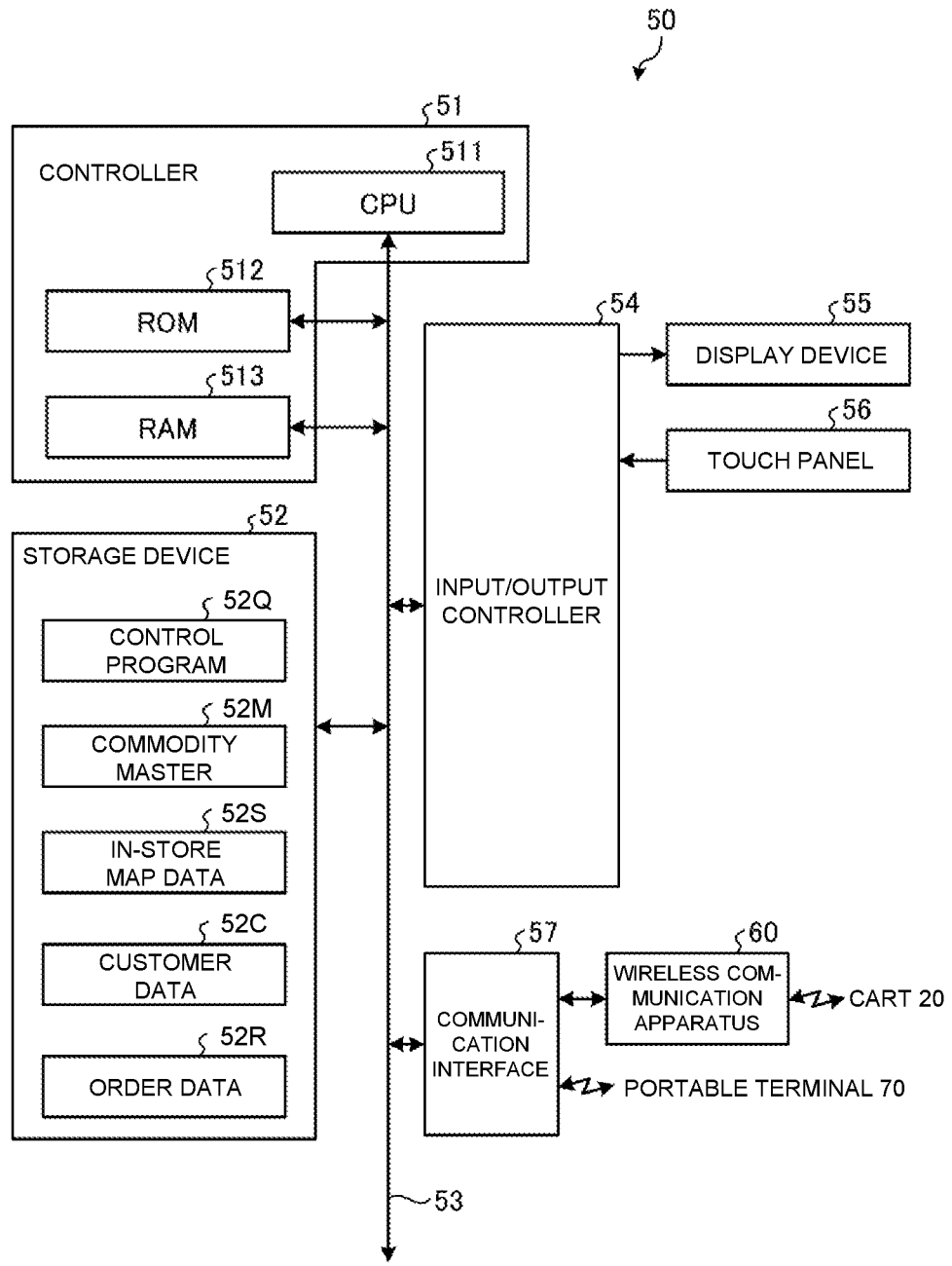
FIG. 6 is a hardware block diagram showing an example of a hardware configuration of a server apparatus according to the embodiment.

Next, a hardware configuration of the server apparatus 50 will be described with reference to FIG. 6. FIG. 6 is a hardware block diagram showing an exemplary hardware configuration of the server apparatus.

The server apparatus 50 includes a controller 51, a storage device 52, an input/output controller 54, and a communication interface 57.

The controller 51 has a general computer configuration including a processor 511, a read only memory (ROM) 512, and a random access memory (RAM) 513. The processor 511 is a central processing unit (CPU), for example. Hereinafter, the processor 511 is referred to as a CPU 511. The CPU 511 reads various programs, data files, and the like stored in the ROM 512 and the storage device 52 to be described later, and loads them into the RAM 513. The CPU 511 operates according to various programs, data files, and the like loaded into the RAM 513 to manage overall control of the server apparatus 50.

The controller 51 is connected to each of the storage device 52, the input/output controller 54, and the communication interface 57 via an internal bus 53.

The storage device 52 holds the stored information even when the power supply is turned off. The storage device 52 is, for example, a hard disk drive (HDD). Further, the storage device 52 may include a nonvolatile memory such as a flash memory, instead of the HDD. The storage device 52 stores programs and the like including a control program 52Q. The control program 52Q is a program for allowing the server apparatus 50 to perform its functions.

Note that the control program 52Q may be provided by being incorporated in the ROM 512 in advance. Further, the control program 52Q may be configured to be recorded on a computer readable recording medium such as a CD-ROM, a flexible disk (FD), a CD-R, or a digital versatile disc (DVD) and then provided in the file form installable or executable in the controller 51. In addition, the control program 52Q may be configured to be stored in a computer connected to a network such as the Internet and to be provided by downloading over a network. Further, the control program 52Q may be configured to be provided or distributed over a network such as the Internet.

The storage device 52 further stores a commodity master 52M, in-store map data 52S, customer data 52C, and order data 52R.

The commodity master 52M is a master file in which commodity information such as the name, unit price, and the like of a commodity is stored in association with the commodity code. Note that the commodity master 52M is updated at any time in accordance with the commodities to be shipped to the store.

The in-store map data 52S is information including the layout of the store and the layout position of the commodity (shelf allocation data). The layout of the store is so-called map data including the positions and shapes of the aisles in the store. The layout position of the commodity is information in which the coordinate position, at which the commodity is arranged, is associated with the commodity information (for example, commodity code) of the commodity. Although the format of the in-store map data 52S is not limited, for example, a similar format (data in which the aisle is represented by link and node) to that of the road map used in a car navigation system is used.

The customer data 52C is data including an identification number and the like of the customer, which are registered in advance.

The order data 52R is order information including the identification number of the customer, the name of the commodity to be purchased, and the number of commodities to be purchased. Note that any method of obtaining the order data 52R is used. In other words, the server apparatus 50 may obtain the order data 52R from a customer's smartphone via the Internet 72 or may obtain the order data 52R from a customer's personal computer via the Internet 72. Further, the server apparatus 50 may obtain the order data 52R, which is input by a customer who visits the store while watching a display device 55 of the server apparatus 50 using a touch panel 56.

The input/output controller 54 connects the controller 51, the display device 55 as an input/output device, and the touch panel 56 to each other.

The display device 55 displays various types of information output by the server apparatus 50. The display device 55 is, for example, a liquid crystal display or an organic electroluminescence display.

The touch panel 56 is installed so as to be superimposed on the display surface of the display device 55, and inputs operation information corresponding to a pressing position of the display surface to the server apparatus 50.

The communication interface 57 transmits and receives various types of information between the server apparatus 50 and the cart 20 via the wireless communication apparatus 60. Further, the communication interface 57 transmits and receives various types of information to and from the portable terminal 70.

(Hardware Configuration of Cart)

Figure 7:
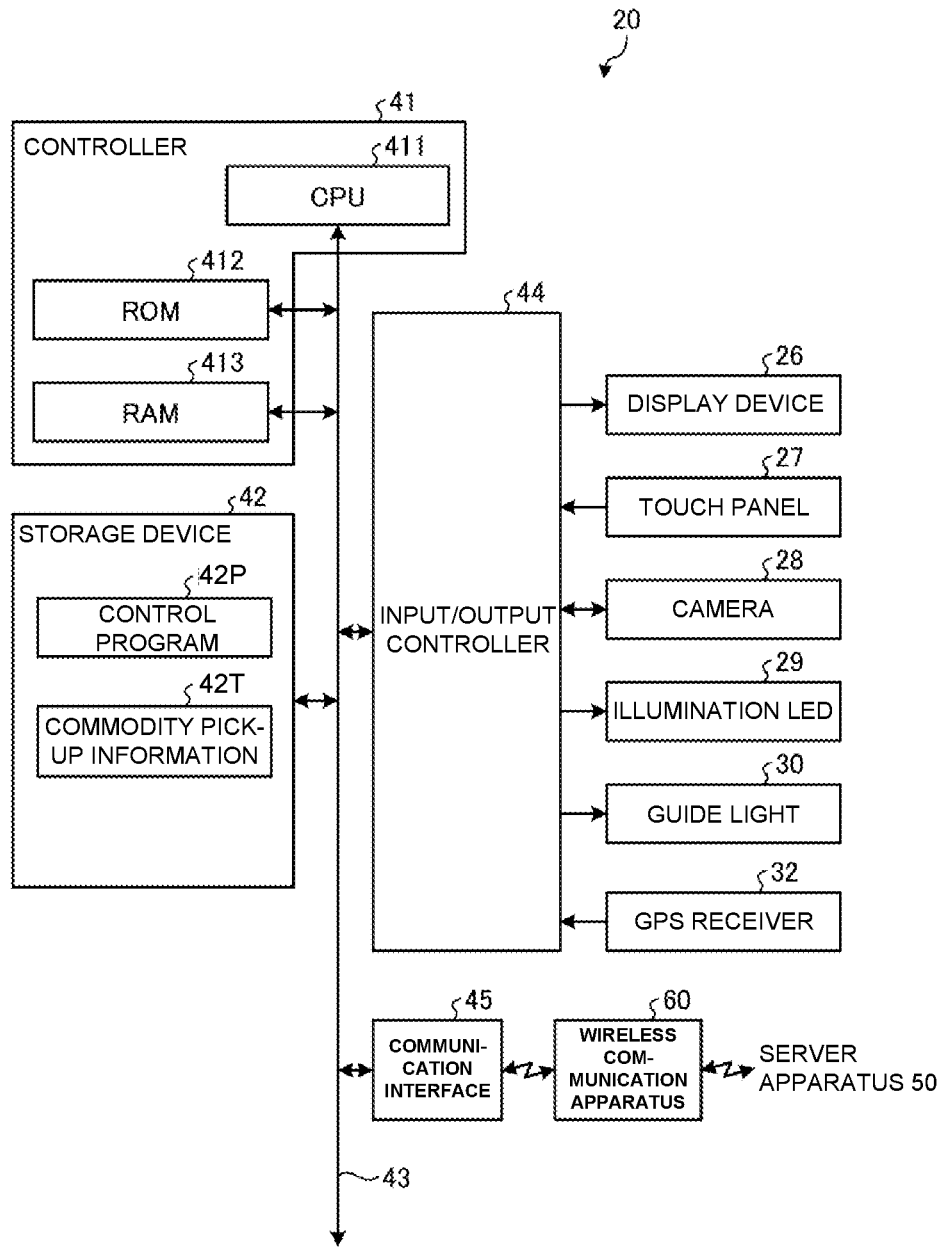
FIG. 7 is a hardware block diagram showing an example of a hardware configuration of the cart according to the embodiment.

Next, a hardware configuration of the cart 20 will be described with reference to FIG. 7. FIG. 7 is a hardware block diagram showing an exemplary hardware configuration of the cart.

The cart 20 includes a controller 41, a storage device 42, an input/output controller 44, and a communication interface 45.

The controller 41 has a general computer configuration including a processor 411, a ROM 412, and a RAM 413. The processor 411 is, for example, a CPU. Hereinafter, the processor 411 is called a CPU 411. The CPU 411 reads various programs, data files, and the like stored in the ROM 412 and the storage device 42 to be described later, and loads them into the RAM 413. The CPU 411 operates according to various programs, data files, and the like loaded into the RAM 413 to manage overall control of the cart 20.

The controller 41 is connected to each of the storage device 42, the input/output controller 44, and the communication interface 45 via an internal bus 43.

The storage device 42 holds the stored information even when the power supply is turned off. The storage device 42 is, for example, an HDD. Further, the storage device 42 may include a nonvolatile memory such as a flash memory, instead of the HDD. The storage device 42 stores programs and the like including a control program 42P. The control program 42P is a program for allowing the cart 20 to perform its functions.

Note that the control program 42P may be provided by being incorporated in the ROM 412 in advance. Further, the control program 42P may be configured to be recorded on a computer readable recording medium such as a CD-ROM, a flexible disk, a CD-R, or a DVD and then provided in the file form installable or executable in the controller 41. In addition, the control program 42P may be configured to be stored in a computer connected to a network such as the Internet and to be provided by downloading over a network. Further, the control program 42P may be configured to be provided or distributed over a network such as the Internet.

The storage device 42 further stores commodity pickup information 42T. The commodity pickup information 42T includes the commodity information and the number of commodities to be picked up, which are transmitted from the server apparatus 50. Note that the storage device 42 may store path information (pickup path information 83) indicating a movement path for picking up the commodities, in addition to the commodity pickup information 42T.

The input/output controller 44 connects the controller 41, the display device 26 as an input/output device, the touch panel 27, the camera 28, the illumination LED 29, the guide light 30, and the GPS receiver 32 to each other.

The display device 26 displays various types of information output by the cart 20 (such as the commodity list and in-store map shown in FIG. 5). The display device 26 is, for example, a liquid crystal display or an organic electroluminescence display.

The touch panel 27 is installed so as to be superimposed on the display surface of the display device 26, and inputs operation information corresponding to a pressing position of the display surface to the cart 20.

As described above (see FIG. 2), the plurality of cameras 28 are installed in the container installation frames 24 and 25 and capture images of commodities to be put. Note that the camera 28 is a camera using a solid-state imaging device such as a charge coupled device (CCD) or a complementary metal oxide semiconductor (CMOS).

The illumination LED 29 is installed in the vicinity of the camera 28 to illuminate at least the range of the viewing angle θ of the camera 28.

The guide light 30 is an indicator installed in each of the container installation frames 24 and 25 and shows the input position of a commodity to be picked up next as described above (see FIG. 2).

The GPS receiver 32 is a receiver that receives GPS signals. The cart 20 determines its own current position on the basis of the GPS signals received by the GPS receiver 32.

The communication interface 45 transmits and receives various types of information to and from the server apparatus 50.

(Functional Configuration of Server Apparatus)

Figure 8:
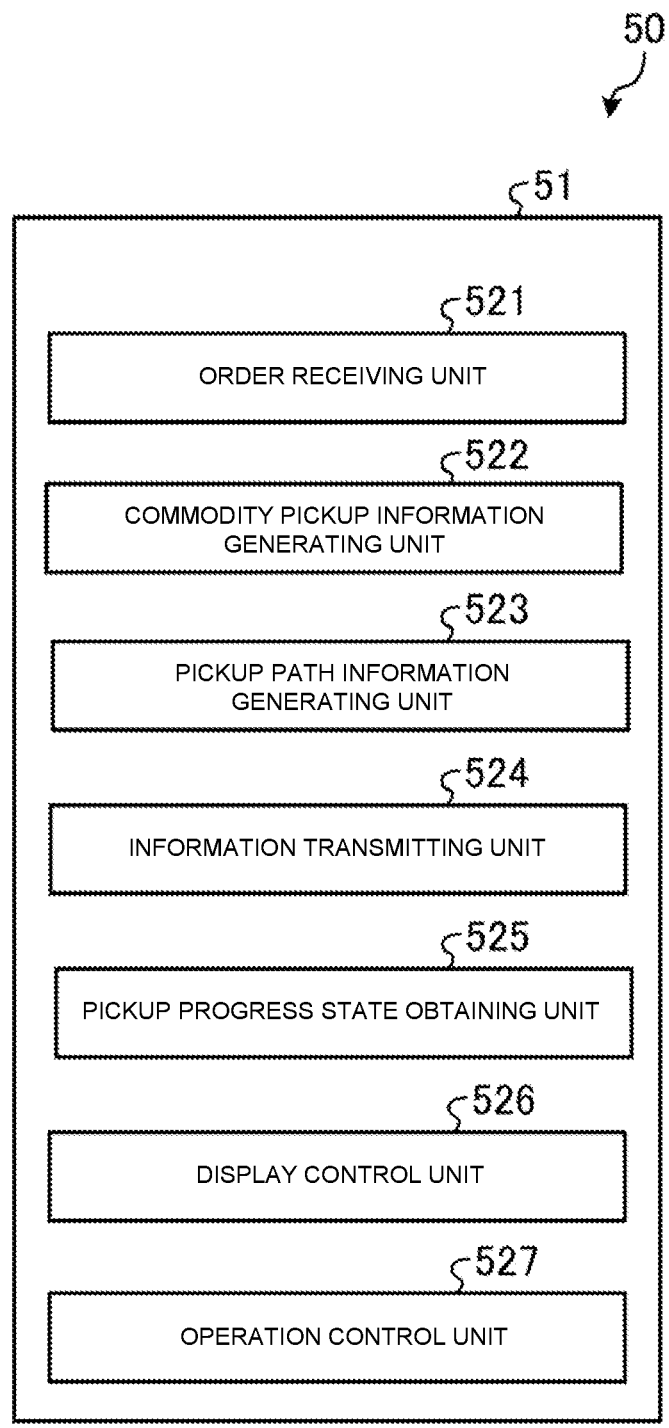
FIG. 8 is a functional block diagram showing an example of a functional configuration of the server apparatus according to the embodiment.

Next, the functional configuration of the server apparatus 50 will be described with reference to FIG. 8. FIG. 8 is a functional block diagram showing an exemplary functional configuration of the server apparatus.

The controller 51 of the server apparatus 50 loads the control program 52Q to the RAM 513 and operates it to implement an order receiving unit 521, a commodity pickup information generating unit 522, a pickup path information generating unit 523, an information transmitting unit 524, a pickup progress state obtaining unit 525, a display control unit 526, and an operation control unit 527 shown in FIG. 8 as functional units.

The order receiving unit 521 obtains information of a customer who has ordered the commodities, and information related to the commodities to be picked up and the number of commodities, that is, order information, from the portable terminal 70. Note that the order receiving unit 521 may obtain the order information input through the operation on the touch panel 56 of the server apparatus 50 by the customer who visits the store.

The commodity pickup information generating unit 522 generates the commodity pickup information 42T (see FIG. 7) including the commodities to be picked up and the number of commodities on the basis of the order information obtained by the order receiving unit 521.

The pickup path information generating unit 523 generates the pickup path information 83 (see FIG. 5) described with reference to FIG. 5, with which the cart 20 is moved to pick up the commodities included in the order information without omission.

The information transmitting unit 524 transmits the commodity pickup information 42T generated by the commodity pickup information generating unit 522 and the pickup path information 83 generated by the pickup path information generating unit 523 to the cart 20. Since a plurality of carts 20 are generally prepared, the information transmitting unit 524 transmits, to a cart 20, an identification number that uniquely identifies the cart 20, the commodity pickup information 42T, and the pickup path information 83. Further, the information transmitting unit 524 transmits the information indicating that all the commodities have been picked up to the server apparatus 50.

The pickup progress state obtaining unit 525 obtains, from the cart 20, the pickup progress state, i.e., information for identifying the commodities picked up and the commodities not yet picked up among the commodities included in the order information.

The display control unit 526 causes the display device 55 to display various types of information generated by the server apparatus 50.

The operation control unit 527 controls the operation of the server apparatus 50 on the basis of the operation information obtained from the touch panel 56.

(Functional Configuration of Cart)

Figure 9:
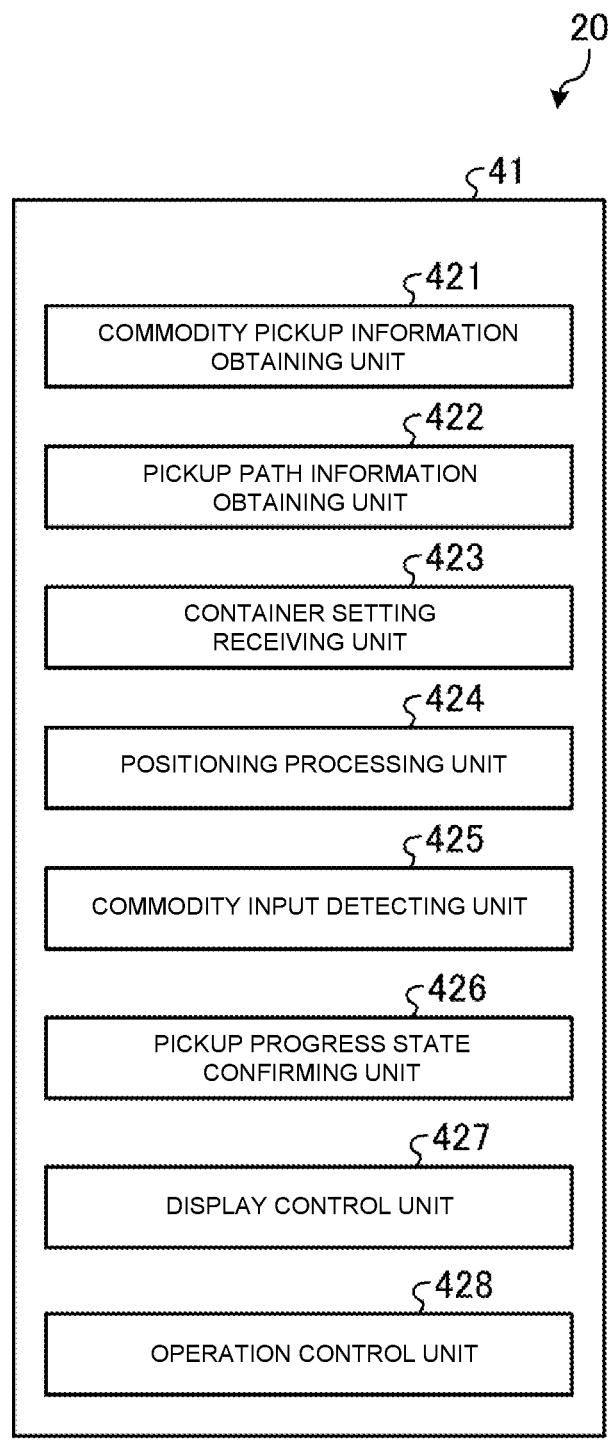
FIG. 9 is a functional block diagram showing an example of a functional configuration of the cart according to the embodiment.

Next, the functional configuration of the cart 20 will be described with reference to FIG. 9. FIG. 9 is a functional block diagram showing an exemplary functional configuration of the cart.

The controller 41 of the cart 20 loads the control program 42P to the RAM 413 and operates it to implement a commodity pickup information obtaining unit 421, a pickup path information obtaining unit 422, a container setting receiving unit 423, a positioning processing unit 424, a commodity input detecting unit 425, a pickup progress state confirming unit 426, a display control unit 427, and an operation control unit 428 shown in FIG. 9 as functional units.

The commodity pickup information obtaining unit 421 obtains, from the server apparatus 50, information of a customer who has ordered the commodities, and information related to the commodities to be picked up and the number of commodities, that is, the commodity pickup information 42T. Note that the commodity pickup information obtaining unit 421 is an exemplary obtaining unit in this embodiment.

The pickup path information obtaining unit 422 obtains the pickup path information 83 generated by the pickup path information generating unit 523 from the server apparatus 50.

The container setting receiving unit 423 receives information indicating in which one of the plurality of accommodation portions (bags 311 and 312 and baskets 313 and 314) of the cart 20 the commodity ordered by the customer is to be put. Note that a specific accommodation position is set by the store clerk (picker) who moves the cart 20 when performing an operation of indicating the accommodation position on the touch panel 27 while viewing a pattern (not shown) indicating the layout of the accommodation portion displayed on the display device 26.

The positioning processing unit 424 determines the current position of the cart 20. Note that the positioning processing unit 424 is an example of a positioning unit in this embodiment.

The commodity input detecting unit 425 detects the fact that the picked-up commodity has been put in the accommodation portion and the commodity information of the input commodity on the basis of the images captured by imaging the bags 311 and 312 and the baskets 313 and 314 (accommodation portions). Note that the commodity input detecting unit 425 is an exemplary detector in this embodiment.

The pickup progress state confirming unit 426 confirms to what extent the pickup has been completed by referring to the commodity pickup information 42T and a detection result of the commodity input detecting unit 425.

The display control unit 427 identifies the commodities picked up, the commodities to be picked up next, and the commodities not yet picked up and displays them on the display device 26. Further, the display control unit 427 displays on the display device 26 the pickup path information 83 and the information indicating the position of the commodity to be picked up. Furthermore, the display control unit 427 controls the turning on and off of the guide light 30. Note that the display control unit 427 is an exemplary display unit in this embodiment.

The operation control unit 428 controls the operation of the cart 20 on the basis of the operation information obtained from the touch panel 27.

(Flow of Processing Performed by Commodity Pickup System)

Figure 10:
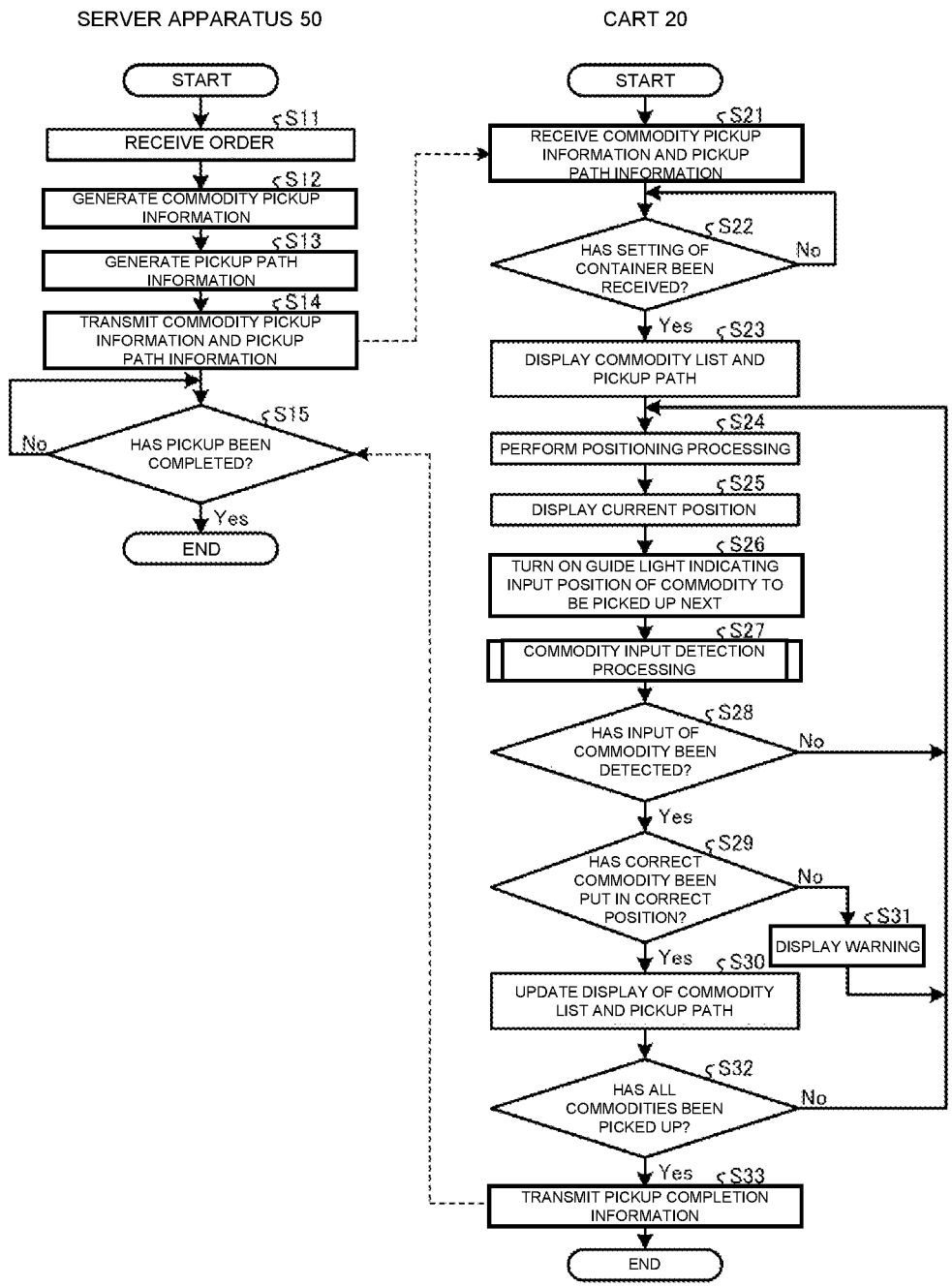
FIG. 10 is a flowchart showing an example of processing performed by the commodity pickup system of a first embodiment according to the embodiment.

Next, the flow of the processing performed by the commodity pickup system 10 will be described with reference to FIG. 10. FIG. 10 is a flowchart showing exemplary processing performed by the commodity pickup system of the first embodiment.

(Flow of Processing Performed by Server Apparatus)

First, the flow of the processing performed by the server apparatus 50 will be described. In Step S11, the order receiving unit 521 of the controller 51 receives an order of the customer, that is, the order data 52R including the identification number of the customer, the name of a commodity to be purchased, and the number of commodities from the portable terminal 70.

In Step S12, the commodity pickup information generating unit 522 of the controller 51 generates the commodity pickup information 42T.

In Step S13, the pickup path information generating unit 523 of the controller 51 generates the pickup path information 83 indicating the movement path for picking up the commodities.

In Step S14, the information transmitting unit 524 of the controller 51 transmits the commodity pickup information 42T and the pickup path information 83 to the cart 20.

In Step S15, the pickup progress state obtaining unit 525 of the controller 51 determines whether the pickup of all the commodities has been completed. If it is determined that the pickup of all the commodities has been completed (Step S15: Yes), the controller 51 of the server apparatus 50 terminates the processing of FIG. 10. On the other hand, if it is not determined that the pickup of all the commodities has been completed (Step S15: No), the controller 51 repeats the determination of Step S15.

(Flow of Processing Performed by Cart)

Next, the flow of the processing performed by the cart 20 will be described. In Step S21 of FIG. 10, the commodity pickup information obtaining unit 421 of the controller 41 obtains the commodity pickup information 42T from the server apparatus 50. Further, the pickup path information obtaining unit 422 obtains the pickup path information 83 from the server apparatus 50.

In Step S22, the container setting receiving unit 423 of the controller 41 determines whether the setting of the container has been received. If it is determined that the setting of the container has been received (Step S22: YES), the processing of the controller 41 proceeds to Step S23. On the other hand, if it is not determined that the setting of the container has been received (Step S22: No), the controller 41 repeats the determination of Step S22.

In Step S23, the display control unit 427 of the controller 41 displays the list of commodities to be picked up and the pickup path on the display device 26.

In Step S24, the positioning processing unit 424 of the controller 41 determines the current position of the cart 20.

In Step S25, the display control unit 427 of the controller 41 displays the current position of the cart 20 on the display device 26.

In Step S26, the display control unit 427 of the controller 41 turns on the guide light 30 indicating the input position of a commodity to be picked up next.

Next, in Step S27, the commodity input detecting unit 425 of the controller 41 performs commodity input detection processing for determining in which of the accommodation portions 31 (the bags 311 and 312 and the baskets 313 and 314) the commodity has been put and for identifying the input commodity. The detailed flow of the commodity input detection processing will be described later (see FIG. 11).

In Step S28, the commodity input detecting unit 425 of the controller 41 determines whether the input of a commodity has been detected. If it is determined that the input of the commodity has been detected (Step S28: YES), the processing of the controller 41 proceeds to Step S29. On the other hand, if it is not determined that the input of the commodity has been detected (Step S28: NO), the processing of the controller 41 returns to Step S24.

In Step S29, the commodity input detecting unit 425 of the controller 41 determines whether the correct commodity has been put in the correct accommodation portion 31. If it is determined that the correct commodity has been put in the correct accommodation portion 31 (Step S29: YES), the processing of the controller 41 proceeds to Step S30. On the other hand, if it is not determined that the correct commodity has been put in the correct accommodation portion 31 (Step S29: No), the processing of the controller 41 proceeds to Step S31.

In Step S30, the display control unit 427 of the controller 41 updates the commodity list and the pickup path, which are displayed on the display device 26.

In Step S32, the pickup progress state confirming unit 426 of the controller 41 confirms whether all the commodities have been picked up. If it is confirmed that all the commodities have been picked up (Step S32: YES), the processing of the controller 41 proceeds to Step S33. On the other hand, if it is not confirmed that all the commodities have been picked up (Step S32: No), the processing of the controller 41 returns to Step S24. In Step S24, the controller 41 repeats the processing described above.

In Step S33, the pickup progress state confirming unit 426 of the controller 41 transmits information indicating that the pickup of all the commodities has been completed to the server apparatus 50. Subsequently, the controller 41 of the cart 20 terminates the processing of FIG. 10.

On the other hand, in Step S29, if it is not determined that the correct commodity has been put in the correct accommodation portion 31 (Step S29: No), the display control unit 427 of the controller 41 displays, on the display device 26, a warning for prompting confirmation of the input position and the input commodity. Subsequently, the processing of the controller 41 returns to Step S24.

(Flow of Commodity Input Detection Processing)

Figure 11:
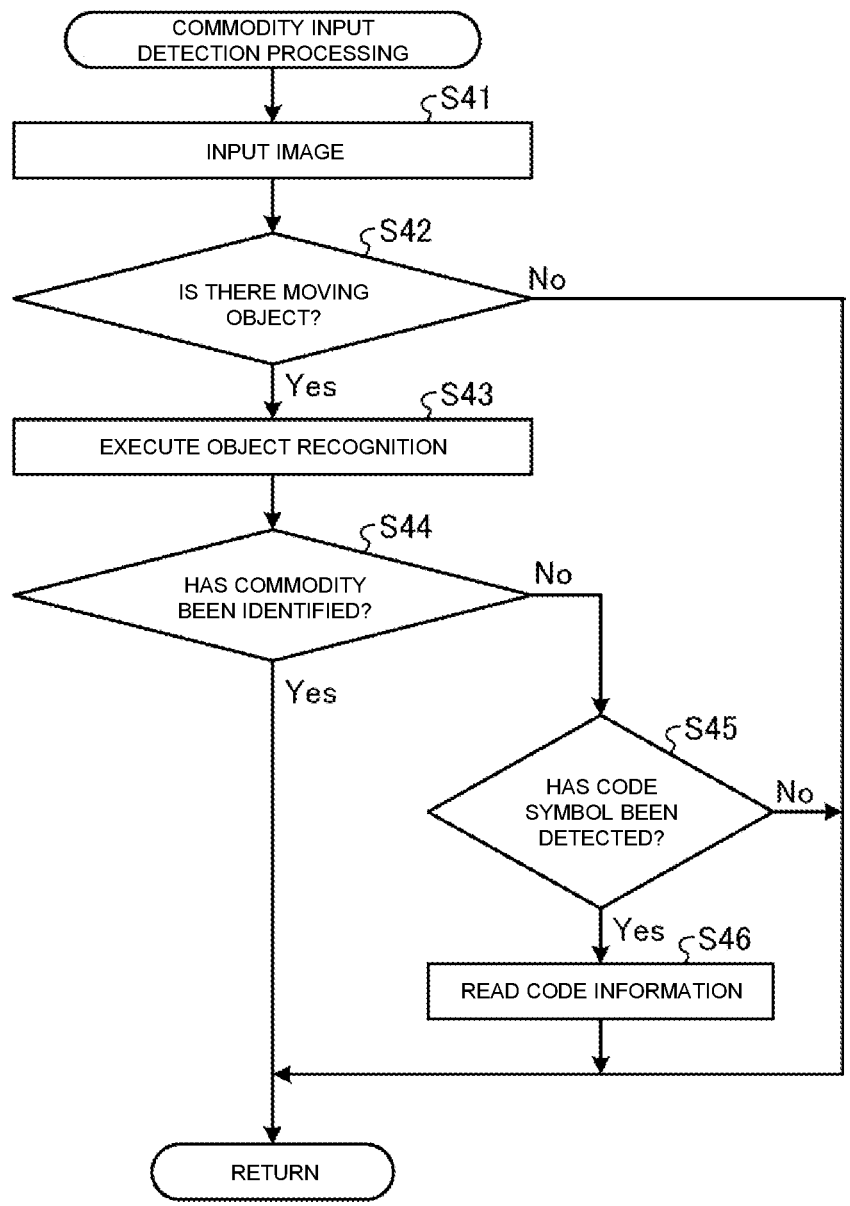
FIG. 11 is a flowchart showing an example of processing performed by a commodity input detecting unit of the cart according to the embodiment.

Next, the flow of the commodity input detection processing performed in Step S27 of FIG. 10 will be described with reference to FIG. 11. FIG. 11 is a flowchart showing exemplary processing performed by the commodity input detecting unit of the controller 41 of the cart 20.

In Step S41, the commodity input detecting unit 425 of the controller 41 captures the images by the cameras 28.

In Step S42, the commodity input detecting unit 425 of the controller 41 determines whether there is a moving object in the images captured by the cameras 28. If it is determined that there is a moving object in the images captured by the cameras 28 (Step S42: YES), the processing of the controller 41 proceeds to Step S43. On the other hand, if it is not determined that there is a moving object in the images captured by the cameras 28 (Step S42: NO), the processing of the controller 41 returns to the main routine (the flowchart of FIG. 10).

In Step S43, the commodity input detecting unit 425 of the controller 41 performs the object recognition processing on the image $I(t+\Delta t)$.

Subsequently, in Step 44, the commodity input detecting unit 425 of the controller 41 determines whether the commodity has been identified. If it is determined that the commodity has been identified (Step S44: YES), the processing of the controller 41 returns to the main routine. On the other hand, if it is not determined that the commodity has been identified (Step S44: No), the processing of the controller 41 proceeds to Step S45.

In Step S45, the commodity input detecting unit 425 of the controller 41 determines whether a code symbol has been detected from the image I(t+Δt). If it is determined that a code symbol has been detected from the image I(t+Δt) (Step S45: Yes), the processing of the controller 41 proceeds to Step S46. On the other hand, if it is not determined that a code symbol has been detected from the image I(t+Δt) (Step S45: NO), the processing of the controller 41 returns to the main routine.

In Step S46, the commodity input detecting unit 425 of the controller 41 reads the code information recorded in the detected code symbol. Subsequently, the processing of the controller 41 returns to the main routine.

As described above, in the cart 20 (commodity pickup apparatus) of the first embodiment, the commodity pickup information obtaining unit 421 (obtaining unit) of the controller 41 obtains information related to the commodity to be picked up and the number of commodities. The commodity input detecting unit 425 (detector) of the controller 41 detects the fact that the picked-up commodity has been put in the accommodation portion 31 and the commodity information of the input commodity on the basis of the images obtained by imaging the accommodation portion 31. The display control unit 427 (display unit) of the controller 41 then identifies the commodity picked up, the commodity to be picked up next, and the commodity not yet picked up, and displays them on the display device 26. Therefore, it is possible to certainly recognize that the ordered commodity has been picked up.

Further, in the cart 20 of the first embodiment, the accommodation portion 31 includes the plurality of bags 311 and 312 (containers) and the plurality of baskets 313 and 314 (containers) for distinguishing and accommodating commodities for each order. The commodity pickup information obtaining unit 421 (obtaining unit) of the controller 41 obtains the information related to the commodity to be picked up and the number of commodities for each of the containers. The commodity input detecting unit 425 (detector) of the controller 41 detects the fact that the commodity picked up has been put in the correct container and the commodity information of the input commodity. Therefore, it is possible to identify and recognize the container in which the picked-up commodity is put.

Further, in the cart 20 of the first embodiment, the positioning processing unit 424 (positioning unit) of the controller 41 determines the current position of the cart 20. The commodity pickup information obtaining unit 421 (obtaining unit) of the controller 41 obtains the pickup path information 83 (path information) with which the cart 20 is moved to pick up the commodities without omission. The display control unit 427 (display unit) of the controller 41 displays, on the display device 26, the current position of the cart 20 obtained by the positioning processing unit 424 and the pickup path information 83 obtained by the commodity pickup information obtaining unit 421. Therefore, the store clerk can efficiently pick up all the commodities while moving along the pickup path information 83 and picking up the commodities.

Further, in the cart 20 of the first embodiment, the plurality of cameras 28 (imaging devices) directed to the inside of the accommodation portion 31 are provided at the outer edge of the accommodation portion 31. The commodity input detecting unit 425 (detector) of the controller 41 detects the fact that the picked-up commodity has been put in the accommodation portion 31, and a feature amount for identifying the commodity or the code symbol attached to the commodity, from the plurality of images captured by the cameras 28 (imaging devices) in time series. So, when the input of the commodity is monitored from a plurality of different directions, the commodity can be recognized if the commodity appears in the image captured from at least one direction. Therefore, it is possible to certainly recognize the input of the commodity and the type of the commodity regardless of the manner in which the commodity is held.

Further, in the commodity pickup system 10 of the first embodiment, the controller 51 of the server apparatus 50 receives the order of commodities, generates information related to the commodities to be picked up and the number of commodities, and transmits them to the cart 20. The controller 41 of the cart 20 (commodity pickup apparatus) obtains the information related to the commodities to be picked up and the number of commodities from the server apparatus 50. The controller 41 detects the fact that the picked-up commodity has been put in the accommodation portion 31 and the commodity information of the input commodity, on the basis of the images obtained by imaging the accommodation portion 31 that stores the picked-up commodity. The controller 41 identifies the commodity picked up, the commodity to be picked up next, and the commodity not yet picked up, and displays them on the display device 26. Therefore, it is possible to certainly recognize that the ordered commodity has been picked up.

Second Embodiment

Next, a commodity pickup system as a second embodiment will be described. A system configuration of the commodity pickup system as a second embodiment is the same as that of the commodity pickup system 10 of the first embodiment (see FIG. 1). Hereinafter, the commodity pickup system as a second embodiment will be referred to as a commodity pickup system 100. However, the commodity pickup system 100 includes a server apparatus 500 (see FIG. 13) and a cart 200 (see FIG. 14), which will be described later, instead of the server apparatus 50 and the cart 20 of the first embodiment. The commodity pickup system 100 has a function of transmitting a photograph of a picked-up commodity, transmission of which is desired by the customer, in addition to the functions of the commodity pickup system 10.

Note that the hardware configuration of the server apparatus 500 is the same as the hardware configuration of the server apparatus 50 of the first embodiment (see FIG. 6). Further, the hardware configuration of the cart 200 is the same as the hardware configuration of the cart 20 described in the first embodiment (see FIG. 7). Therefore, the following description will be given using the same reference numerals as those used in the first embodiment.

Figure 12:
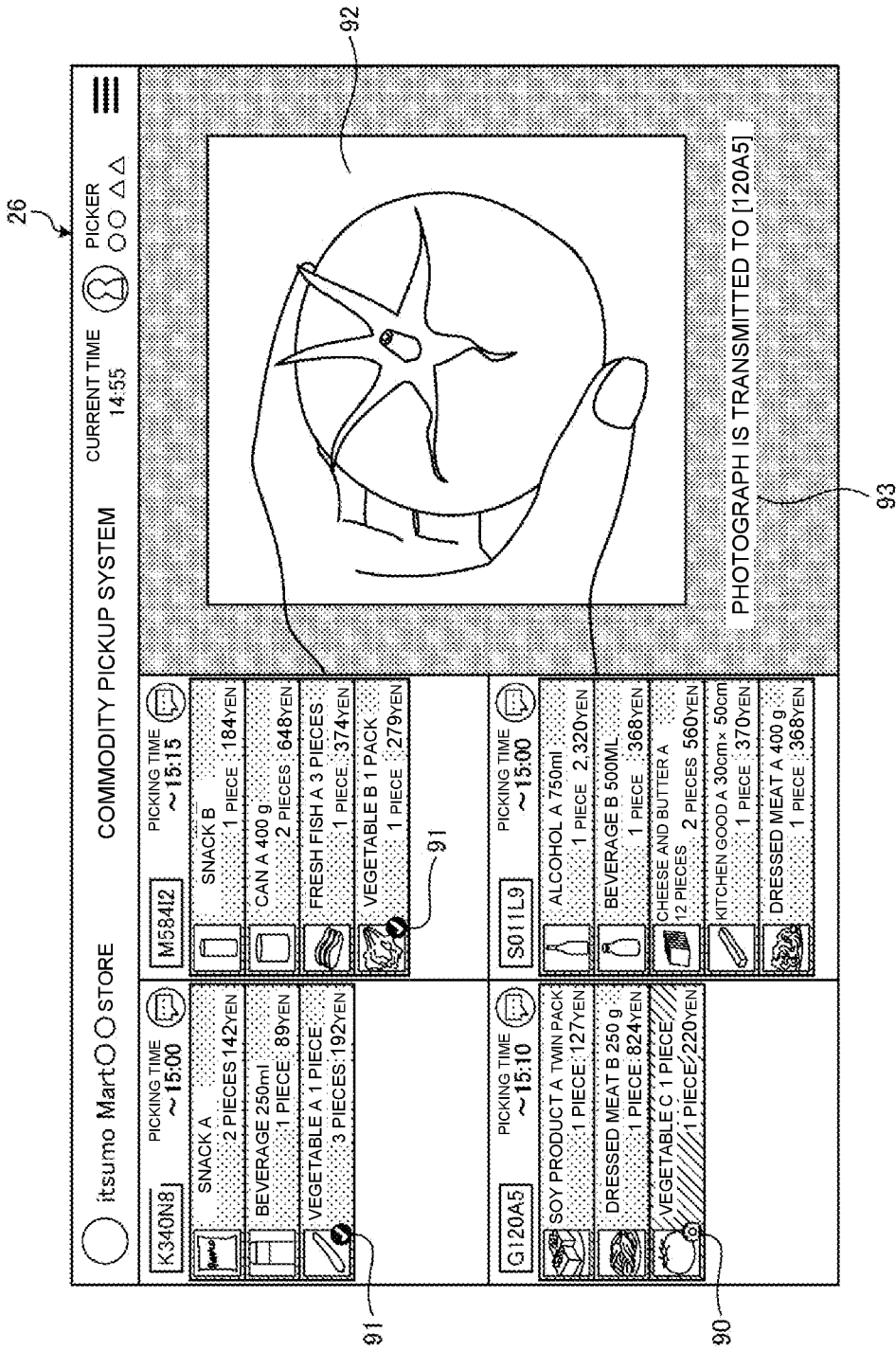
FIG. 12 is a view for describing a commodity image transmitting function of the cart of a second embodiment according to the embodiment.

FIG. 12 is a diagram for explaining a commodity image transmitting function of the cart 200 of the second embodiment. First, when ordering commodities, a customer provides a commodity, for which transmission of a photograph thereof is desired, with information indicating that transmission of its photograph is desired, and then orders commodities. The server apparatus 500 receives the order from the customer and generates, for a commodity for which transmission of its photograph is desired, the commodity pickup information 42T with the information indicating that transmission of the photograph is necessary.

When the list of commodities to be picked up is displayed on the display device 26, the cart 200 displays a photo icon

90 shown in FIG. 12 on the commodity for which transmission of its photograph is necessary.

When detecting that the commodity to which the photo icon 90 is attached has been put in the accommodation portion 31, the cart 200 displays a captured image 92 on the display device 26 and displays a message 93 indicating that the photograph has been transmitted to the customer. Subsequently, the cart 200 changes the display mode of the photo icon 90 displayed on the display device 26 to a photograph-transmission completion icon 91 indicating that the photograph has been transmitted.

Note that the four cameras 28 of the cart 200 are installed per accommodation portion 31. Thus, the cameras 28 can capture the images of a single commodity from four directions. So, the cart 200 selects, for a commodity for which transmission of its photograph is necessary, an image in which the commodity appears best from the images obtained by imaging the commodity from the four directions, and transmits the selected image to the customer.

(Functional Configuration of Server Apparatus)

Figure 13:
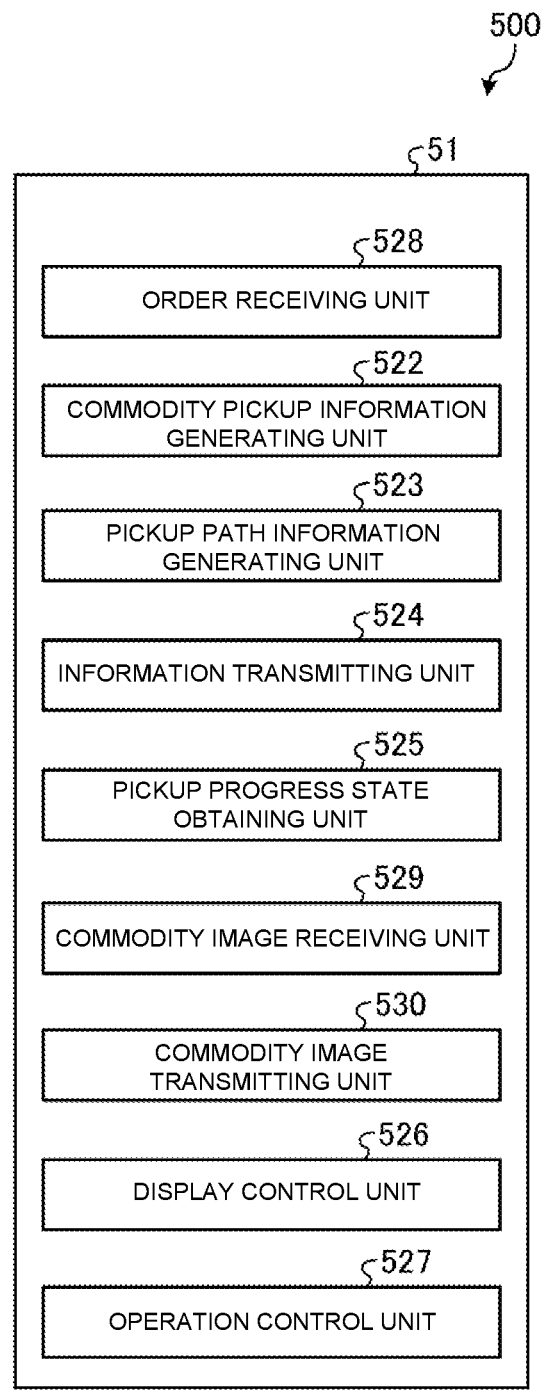
FIG. 13 is a functional block diagram showing an example of a functional configuration of a server apparatus of the second embodiment according to the embodiment.

Next, the functional configuration of the server apparatus 500 will be described with reference to FIG. 13. FIG. 13 is a functional block diagram showing an exemplary functional configuration of the server apparatus 500 of the second embodiment.

The controller 51 of the server apparatus 500 loads a control program 51Q to the RAM 513 and operates it to implement functional units shown in FIG. 13. More specifically, the controller 51 of the server apparatus 500 implements an order receiving unit 528, a commodity pickup information generating unit 522, a pickup path information generating unit 523, an information transmitting unit 524, a pickup progress state obtaining unit 525, a commodity image receiving unit 529, a commodity image transmitting unit 530, a display control unit 526, and an operation control unit 527 as functional units. Of those, the commodity pickup information generating unit 522, the pickup path information generating unit 523, the information transmitting unit 524, the pickup progress state obtaining unit 525, the display control unit 526, and the operation control unit 527 implement the same functional units as the functional units of the server apparatus 50 described in the first embodiment.

The controller 51 of the server apparatus 500 implements the order receiving unit 528 in place of the order receiving unit 521. The order receiving unit 528 of the controller 51 obtains, from the portable terminal 70, information of a customer who has ordered the commodities, information related to the commodities to be picked up and the number of commodities, i.e., order information, and information for specifying a commodity for which transmission of its image is desired.

The commodity image receiving unit 529 of the controller 51 receives, from the cart 200, the image of the commodity specified by the customer and information (for example, commodity code) for uniquely identifying the commodity appearing in the image.

The commodity image transmitting unit 530 of the controller 51 transmits the image of the commodity specified by the customer to the portable terminal 70 of the customer.

(Functional Configuration of Cart)

Figure 14:
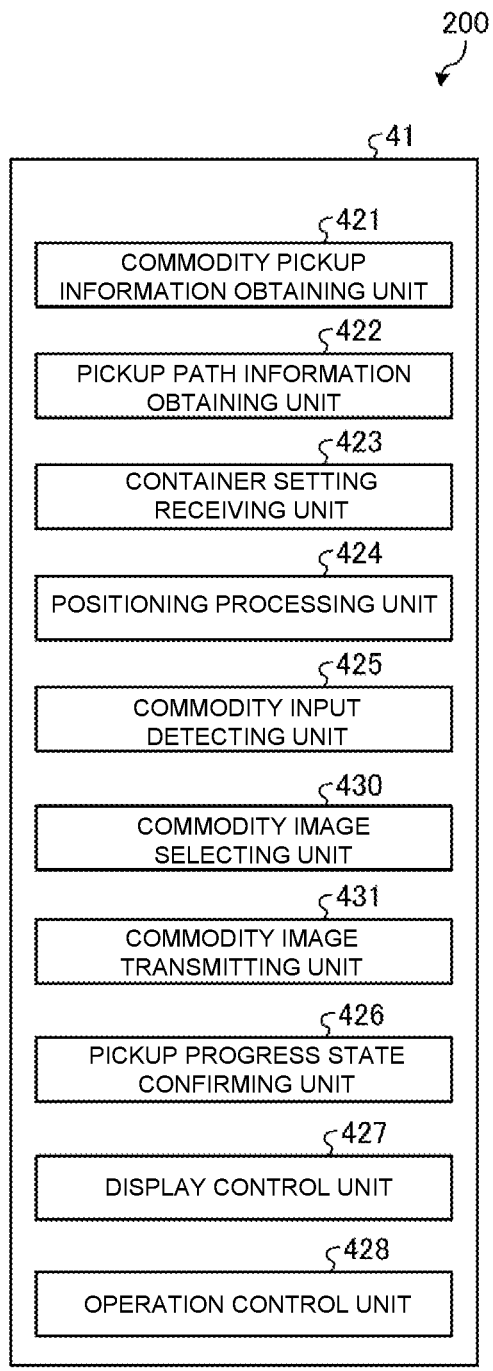
FIG. 14 is a functional block diagram showing an example of a functional configuration of the cart of the second embodiment according to the embodiment.

Next, the functional configuration of the cart 200 will be described with reference to FIG. 14. FIG. 14 is a functional block diagram showing an exemplary functional configuration of the cart of the second embodiment.

The controller 41 of the cart 200 loads the control program 42P to the RAM 413 and operates it to implement functional units shown in FIG. 14. More specifically, the controller 41 of the cart 200 implements a commodity pickup information obtaining unit 421, a pickup path information obtaining unit 422, a container setting receiving unit 423, a positioning processing unit 424, a commodity input detecting unit 425, a commodity image selecting unit 430, a commodity image transmitting unit 431, a pickup progress state confirming unit 426, a display control unit 427, and an operation control unit 428 as functional units. Of these, the commodity pickup information obtaining unit 421, the pickup path information obtaining unit 422, the container setting receiving unit 423, the positioning processing unit 424, the commodity input detecting unit 425, the pickup progress state confirming unit 426, the display control unit 427, and the operation control unit 428 implement the same functional units as the functional units of the cart 20 described in the first embodiment.

The commodity image selecting unit 430 of the controller 41 selects an image to be transmitted to the customer from the images obtained by imaging the commodity specified by the customer. The commodity image selecting unit 430 selects an image in which the commodity appears best, for example, from the images captured by the commodity input detecting unit 425 from the plurality of directions. The image in which the commodity appears best is selected, for example, on the basis of criteria such as a commodity appearing largest, a commodity appearing brightest, and a commodity appearing clearest.

The commodity image transmitting unit 431 of the controller 41 transmits the image selected by the commodity image selecting unit 430 to the server apparatus 500, together with information (for example, commodity code) for uniquely identifying the commodity appearing in the image.

(Flow of Processing Performed by Commodity Pickup System)

Figure 15:
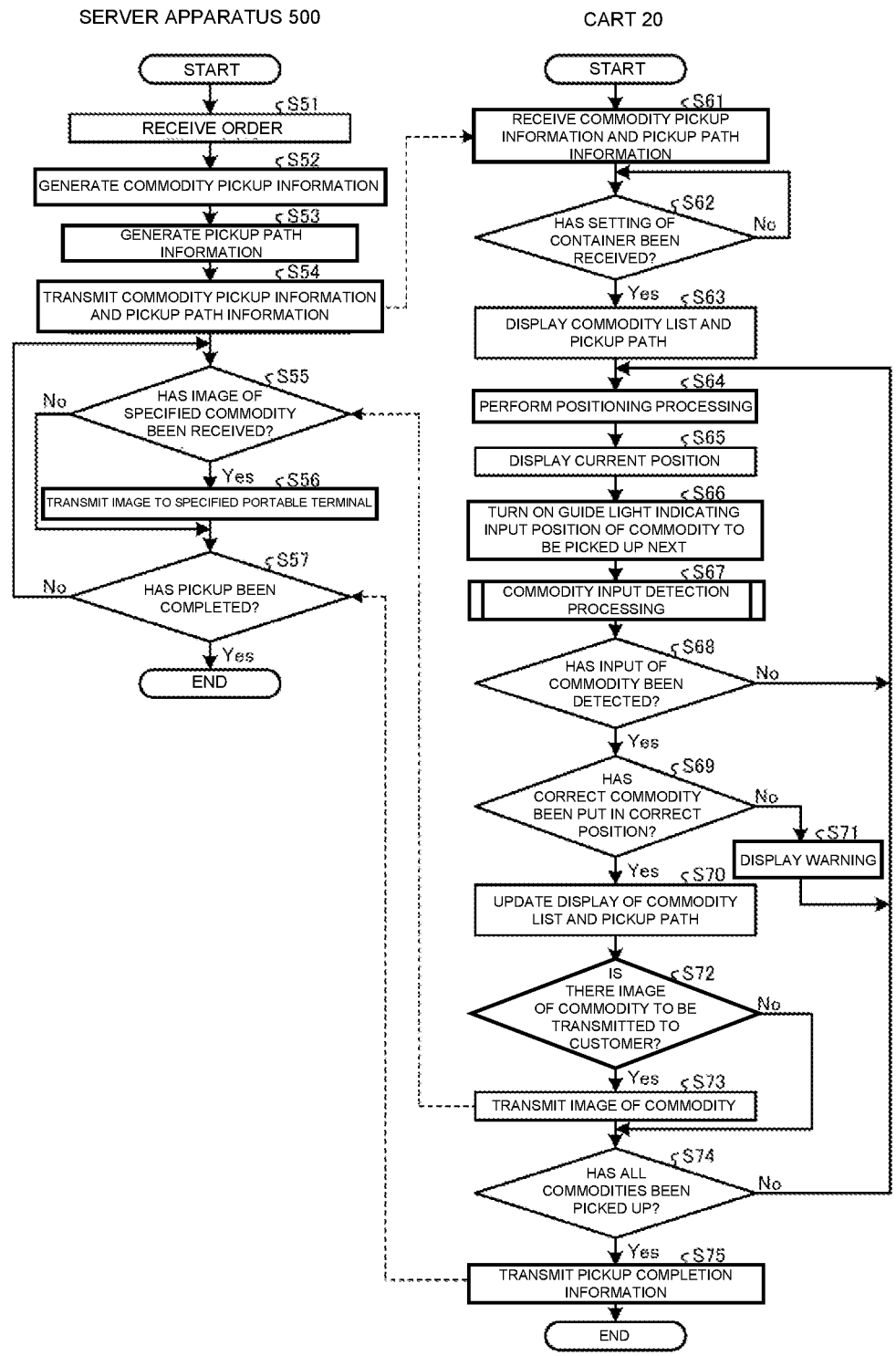
FIG. 15 is a flowchart showing an example of processing performed by the commodity pickup system of the second embodiment according to the embodiment.

Next, the flow of the processing performed by the commodity pickup system 100 will be described with reference to FIG. 15. FIG. 15 is a flowchart showing exemplary processing performed by the commodity pickup system of the second embodiment.

(Flow of Processing Performed by Server Apparatus)

First, the flow of the processing performed by the server apparatus 500 will be described. In Step S51 of FIG. 15, the order receiving unit 528 of the controller 51 receives an order of the customer, that is, order data R including the identification number of the customer, the name of a commodity to be purchased, and the number of commodities, and information for specifying the commodity for which transmission of its image is desired, from the portable terminal 70.

In Step S52, the commodity pickup information generating unit 522 of the controller 51 generates the commodity pickup information 42T. Note that the commodity pickup information 42T includes the commodity information and the number of commodities to be picked up, and the information for specifying a commodity for which transmission of its image is desired.

In Step S53, the pickup path information generating unit 523 of the controller 51 generates the pickup path information 83 indicating the movement path for picking up the commodities.

In Step S54, the information transmitting unit 524 of the controller 51 transmits the commodity pickup information 42T and the pickup path information 83 to the cart 200.

In Step S55, the commodity image receiving unit 529 of the controller 51 determines whether the image of the commodity specified by the customer has been received from the cart 200. If it is determined that the image of the commodity specified by the customer has been received (Step S55: Yes), the processing of the controller 51 proceeds to Step S56. On the other hand, if it is not determined that the image of the commodity specified by the customer has been received (Step S55: NO), the processing of the controller 51 proceeds to Step S57.

In Step S56, the commodity image transmitting unit 530 of the controller 51 transmits the received image to the portable terminal 70 of the customer.

In Step S57, the pickup progress state obtaining unit 525 of the controller 51 determines whether the pickup of all the commodities has been completed. If it is determined that the pickup of all the commodities has been completed (Step S57: YES), the controller 51 of the server apparatus 500 terminates the processing of FIG. 15. On the other hand, if it is not determined that the pickup of all the commodities has been completed (Step S57: No), the processing of the controller 51 returns to Step S55.

(Flow of Processing Performed by Cart)

Next, the flow of the processing performed by the cart 200 will be described. In Step S61 of FIG. 15, the commodity pickup information obtaining unit 421 of the controller 41 obtains the commodity pickup information 42T from the server apparatus 500. Note that the commodity pickup information 42T includes the commodity information and the number of commodities to be picked up, and information for specifying a commodity for which transmission of its image is desired. Further, the pickup path information obtaining unit 422 of the controller 41 obtains the pickup path information 83 from the server apparatus 500.

Since the processing steps from Step S62 to Step S66 are the same as the processing steps from Step S22 to Step S26 described with reference to FIG. 10, the description thereof will be omitted.

Next, in Step S67, the commodity input detecting unit 425 and the commodity image selecting unit 430 of the controller 41 perform commodity input detection processing for determining in which of the accommodation portions 31 (the bags 311 and 312 and the baskets 313 and 314) the commodity has been put, for identifying the commodity that has been put, and for selecting an image to be transmitted to the customer. Note that the detailed flow of the commodity input detection processing will be described later with reference to FIG. 16.

The processing steps of Steps S68, S69, S70, and S71 subsequently performed by the controller 41 are the same as the processing steps of Steps S28, S29, S30, and S31 described with reference to FIG. 10, and thus the description thereof will be omitted.

In Step S72, the commodity image transmitting unit 431 of the controller 41 determines whether there is an image to be transmitted to the customer. If it is determined that there is an image to be transmitted to the customer (Step S72: YES), the processing of the controller 41 proceeds to Step S73. On the other hand, if it is not determined that there is an image to be transmitted to the customer (Step S72: NO), the processing of the controller 41 proceeds to Step S74.

In Step S73, the commodity image transmitting unit 431 of the controller 41 transmits the image of the commodity to the server apparatus 500.

Subsequently, in Step S74, the pickup progress state confirming unit 426 of the controller 41 confirms whether all the commodities have been picked up. If it is confirmed that all the commodities have been picked up (Step S74: YES), the processing of the controller 41 proceeds to Step S75. On the other hand, if it is not confirmed that all the commodities have been picked up (Step S74: No), the processing of the controller 41 returns to Step S64. The controller 41 then repeats the processing described above.

In Step S75, the pickup progress state confirming unit 426 of the controller 41 transmits information indicating that the pickup of all the commodities has been completed to the server apparatus 50. Subsequently, the controller 41 of the cart 200 terminates the processing of FIG. 15.

(Flow of Commodity Input Detection Processing)

Figure 16:
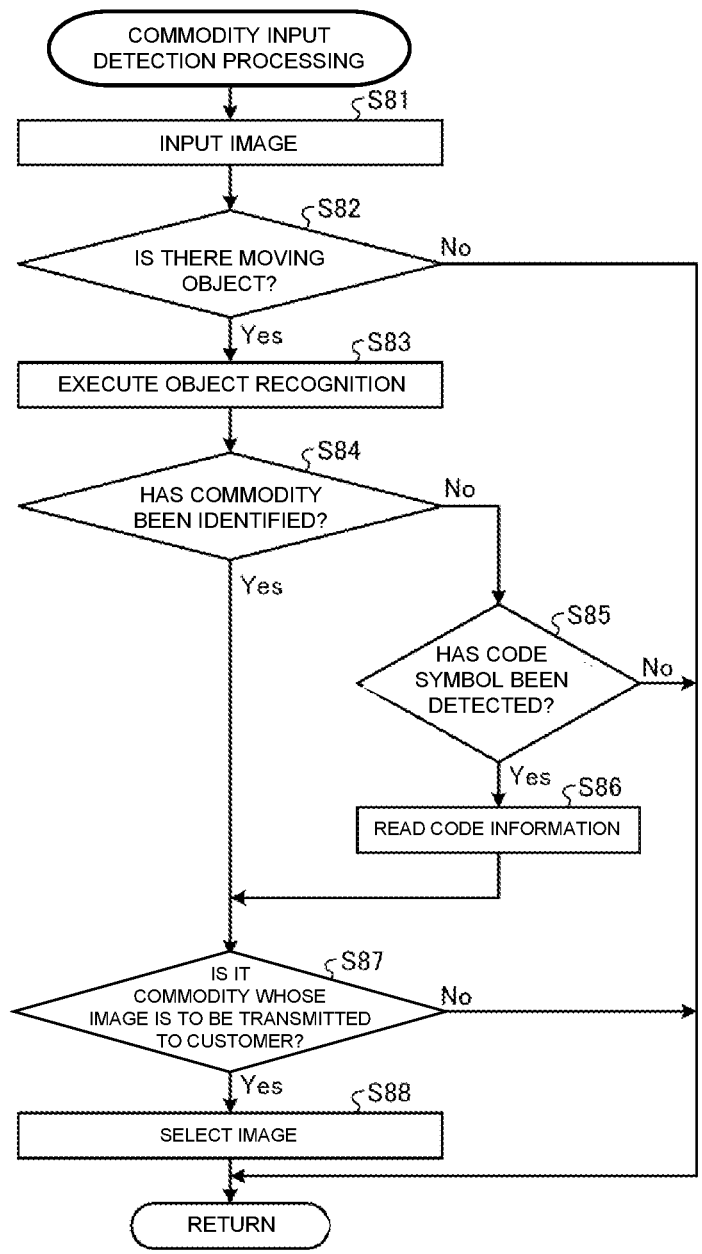
FIG. 16 is a flowchart showing an example of processing performed by the commodity input detecting unit and a commodity image selecting unit of the cart of the second embodiment according to the embodiment.

Next, the flow of the commodity input detection processing performed in Step S67 of FIG. 15 will be described with reference to FIG. 16. FIG. 16 is a flowchart showing exemplary processing performed by the commodity input detecting unit and the commodity image selecting unit of the cart.

Since each processing step of Step S81 to Step S86 in FIG. 16 is the same as each processing step of Step S41 to Step S46 described with reference to FIG. 11, the description thereof will be omitted.

If it is determined in Step S84 of FIG. 16 that the commodity has been identified (Step S84: YES), or after the processing of Step S86 is performed, the processing of the controller 41 proceeds to Step S87. In Step S87, the commodity image transmitting unit 431 of the controller 41 determines whether the identified commodity is a commodity whose image is to be transmitted to the customer. If it is determined that the identified commodity is a commodity whose image is to be transmitted to the customer (Step S87: YES), the processing of the controller 41 proceeds to Step S88. On the other hand, if it is not determined that the identified commodity is a commodity whose image is to be transmitted to the customer (Step S87: NO), the processing of the controller 41 returns to the main routine (flowchart of FIG. 15).

In Step S88, the commodity image selecting unit 430 of the controller 41 selects an image to be transmitted to the server apparatus 500 from the images captured by the commodity input detecting unit 425 from a plurality of directions. Subsequently, the processing of the controller 41 returns to the main routine (flowchart of FIG. 15).

As described above, in the cart 200 (commodity pickup apparatus) of the second embodiment, the commodity input detecting unit 425 (detector) of the controller 41 detects the fact that the commodity has been put in the accommodation portion 31 and the commodity information of the input commodity, on the basis of the images obtained by imaging the accommodation portion 31 from the different directions. The commodity image selecting unit 430 of the controller 41 selects an image in which the commodity appears best from a plurality of images captured from the different directions. The commodity image transmitting unit 431 of the controller 41 transmits, to the server apparatus 500, an image selected by the commodity image selecting unit 430 and information for uniquely identifying the commodity appearing in the image. Therefore, since the image of the picked-up commodity can be transmitted to the customer who has ordered the commodity, the customer can confirm in advance the commodity to be delivered to the customer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity transporting apparatus that is movable within a store and accommodates commodities to be picked up by a store clerk in the store in response to a plurality of orders for purchase from a plurality of customers, comprising:
a plurality of accommodation portions each accommodating one or more commodities;
a communication interface configured to communicate with another apparatus;
a plurality of imaging devices each configured to capture an image of an object in a corresponding one of the accommodation portions;
a sensor configured to detect a current position of the commodity transporting apparatus in the store;
a display device; and
a controller configured to:
acquire order information and path information from said another apparatus, wherein the order information indicates the commodities to be picked up by the store clerk, and the path information indicates a movement path in the store for picking up all of the commodities indicated by the order information,
set each of the plurality of accommodation portions as an accommodation portion for accommodating one or more commodities ordered by a corresponding one of the plurality of customers,
control the display device to display a screen indicating a plurality of commodity lists and a store map, wherein each of the plurality of commodity lists shows the one or more commodities ordered by the corresponding one of the customers and is positioned on the screen corresponding to a position of the corresponding accommodation portion for accommodating the one or more commodities ordered by the corresponding one of the customers, and the store map shows the movement path,
upon receipt of the image from one of the plurality of imaging devices, determine whether a commodity is in the image, and upon determining that a commodity is in the image, determine whether the commodity in the image is a first commodity, which is one of the commodities indicated by the order information,
upon determining that the commodity in the image is the first commodity, store, in a memory, commodity information indicating the first commodity,
based on the commodity information stored in the memory, determine one or more second commodities that are indicated by the order information but have not been picked up,
determine one of the one or more second commodities to be picked up next based on the current position detected by the sensor, and
control the display device to update the screen such that the plurality of commodity lists and the store map indicate the first commodity, said one of the one or more second commodities to be picked up next, and other second commodities not to be picked up next in a distinguishable manner.

2. The commodity transporting apparatus according to claim 1, wherein the controller is configured to sort the commodities to be picked up by the store clerk that are on the plurality of commodity lists in a pickup order thereof.

3. The commodity transporting apparatus according to claim 1, wherein
each of the accommodation portions includes an indicator configured to emit light, and
the controller is configured to control the indicator of one of the accommodation portions in which said one of the one or more second commodities to be picked up next is to be accommodated, to emit light.

4. The commodity transporting apparatus according to claim 1, wherein
the order information further indicates a quantity of each of the commodities to be picked up by the store clerk, and
the controller controls the display device to display on the screen a first quantity of the first commodity, a second quantity of said one of the one or more second commodities to be picked up next, and a third quantity of each of the other second commodities not to be picked up next.

5. The commodity transporting apparatus according to claim 4, wherein the controller controls the display device to display the first quantity of the first commodity, the second quantity of said one of the one or more second commodities to be picked up next, and the third quantity of each of the other second commodities not to be picked up next in different display forms on the map.

6. The commodity transporting apparatus according to claim 5, wherein the controller controls the display device to display the first quantity of the first commodity, the second quantity of said one of the one or more second commodities to be picked up next, and the third quantity of each of the other second commodities not to be picked up next in the plurality of commodity lists using the different display forms.

7. The commodity transporting apparatus according to claim 1, wherein the controller is configured to accept via the screen an input for designating which of the accommodation portions accommodates the one or more commodities ordered by the corresponding one of the customers.

8. The commodity transporting apparatus according to claim 1, wherein
the order information further indicates whether the image of the first commodity needs to be transmitted to a customer who has ordered the first commodity, and
the controller is configured to, in response to determining that the image of the first commodity needs to be transmitted to the customer, control the communication interface to transmit the image to said another device, and control the display device to display the image.

9. A commodity transporting system, comprising:
a server apparatus configured to, in response to a plurality of orders for purchasing commodities to be picked up by a store clerk from a plurality of customers, issue:
order information indicating the commodities to be picked up by the store clerk in a store in response to the plurality of orders from the plurality of customers, and
path information indicating a movement path in the store for picking up all of the commodities indicated by the order information; and
a commodity transporting apparatus that is movable within the store and accommodates the commodities to be picked up by the store clerk in the store, the commodity transporting apparatus including:
a plurality of accommodation portions each accommodating one or more commodities, a communication interface configured to communicate with the server apparatus, a plurality of imaging devices each configured to capture an image of an object in a corresponding one of the plurality of accommodation portions, a sensor configured to detect a current position of the commodity transporting apparatus in the store, a display device, and a controller configured to:
- acquire the order information and the path information from the server apparatus,
- set each of the plurality of accommodation portions as an accommodation portion for accommodating one or more commodities ordered by a corresponding one of the plurality of customers,
- control the display device to display a screen indicating a plurality of commodity lists and a store map, wherein each of the plurality of commodity lists shows the one or more commodities ordered by the corresponding one of the customers and is positioned on the screen corresponding to the position of the corresponding accommodation portion for accommodating the one or more commodities ordered by the corresponding one of the customers, and the store map shows the movement path,
- upon receipt of the image from one of the plurality of imaging devices, determine whether a commodity is in the image, and upon determining that a commodity is in the image, determine whether the commodity in the image is a first commodity, which is one of the commodities indicated by the order information,
- upon determining that the commodity in the image is the first commodity, store, in a memory, commodity information indicating the first commodity,
- based on the commodity information stored in the memory, determine one or more second commodities that are indicated by the order information but have not been picked up,
- determine one of the one or more second commodities to be picked up next based on the current position detected by the sensor, and
- control the display device to update the screen such that the plurality of commodity lists and the store map indicate the first commodity, said one of the one or more second commodities to be picked up next, and other second commodities not to be picked up next in a distinguishable manner.

10. A method for a commodity transporting apparatus that is movable within a store and has a plurality of accommodation portions each accommodating one or more commodities to be picked up by a store clerk in a store in response to a plurality of orders for purchase from a plurality of customers, the method comprising:
- acquiring order information and path information from another apparatus, wherein the order information indicates the commodities to be picked up by the store clerk in the store, and the path information indicates a movement path in the store for picking up all of the commodities indicated by the order information;
- setting each of the plurality of accommodation portions as an accommodation portion for accommodating one or more commodities ordered by a corresponding one of the plurality of customers,
- displaying a screen indicating a plurality of commodity lists and a store map, wherein each of the plurality of commodity lists shows the one or more commodities ordered by the corresponding one of the customers and is positioned on the screen corresponding to a position of the corresponding accommodation portion for accommodating the one or more commodities ordered by the corresponding one of the customers, and the store map shows the movement path;
- upon receipt of the image from one of the plurality of imaging devices, determining whether a commodity is in the image, and upon determining that a commodity is in the image, determining whether the commodity in the image is a first commodity, which is one of the commodities indicated by the order information;
- upon determining that the commodity in the image is the first commodity, storing commodity information indicating the first commodity;
- based on the stored commodity information, determining one or more second commodities that are indicated by the order information but have not been picked up;
- determining one of the one or more second commodities to be picked up next based on the current position detected by a sensor; and
- updating the screen such that the plurality of commodity lists and the store map indicate the first commodity, said one of the one or more second commodities to be picked up next, and other second commodities not to be picked up next in a distinguishable manner.

* * * * *